United States Patent [19]

Naito et al.

[11] Patent Number: 5,191,646
[45] Date of Patent: Mar. 2, 1993

[54] DISPLAY METHOD IN SOFTWARE DEVELOPMENT SUPPORT SYSTEM

[75] Inventors: Ichiro Naito, Tokyo; Hiroyuki Maezawa, Tama; Junko Yamaguchi, Machida; Hidetosi Katumata, Zama; Takeshi Oshio, Yamato, all of Japan

[73] Assignees: Hitachi, Ltd.; Hitachi Computer Engineering Co., Ltd.; Hitachi Seibu Soft Ware Co., Ltd., all of Tokyo, Japan

[21] Appl. No.: 765,462

[22] Filed: Sep. 25, 1991

Related U.S. Application Data

[63] Continuation of Ser. No. 122,116, Nov. 18, 1987, abandoned.

[30] Foreign Application Priority Data

Nov. 20, 1986 [JP] Japan ............................. 61-275207

[51] Int. Cl.⁵ .............................................. G06F 15/20
[52] U.S. Cl. ...................................... 395/161; 395/164; 364/DIG. 1; 364/267.4; 364/DIG. 2; 364/977.1
[58] Field of Search ... 364/200 MS File, 900 MS File, 364/518, 521; 395/161, 140, 155; 340/703, 706, 724

[56] References Cited

U.S. PATENT DOCUMENTS

| | | | |
|---|---|---|---|
| 3,711,863 | 1/1973 | Bloom | 444/1 |
| 4,315,315 | 2/1982 | Kossiakoff | 364/300 |
| 4,455,619 | 6/1984 | Masui et al. | 364/900 |
| 4,558,413 | 12/1985 | Schmidt et al. | 364/300 |
| 4,601,021 | 7/1986 | Paul et al. | 364/521 |
| 4,651,284 | 3/1987 | Watanabe et al. | 364/491 |
| 4,730,315 | 3/1988 | Saito et al. | 371/19 |
| 4,734,854 | 3/1988 | Afshar | 364/200 |
| 4,736,321 | 4/1988 | Brown et al. | 364/300 |
| 4,742,473 | 5/1988 | Shugar et al. | 364/518 |
| 4,764,867 | 8/1988 | Hess | 364/200 |
| 4,809,170 | 2/1989 | Leblang et al. | 364/200 |

OTHER PUBLICATIONS

Bourne S. R. "The UNIX System" Addison-Wesley Publishing Company 1983 pp. 190-195.
"Information Processing:", vol. 24, No. 4, Apr. 1, 1983 (Japan), pp. 514 to 520.
"Hitachi Hyoron", vol. 66, No. 3, Mar. 3, 1984 (Japan), pp. 33 to 36.
"Treatises Informational Processing", vol. 2, No. 4, Jul., 1980 (Japan), pp. 259 to 267.
H. Ehrig, et al., "Programming in the Large with Algebraic Module Specifications", Information Processing 86, Proceedings of the IFIP 10th World Computer Congress, Sep. 1-5, 1986, pp. 675-684.
Jack H. Schwartz, "The Bendix Computer—Aided Software Engineering System: A New Approach to an ADA* Design Language", Proceedings of the IEEE-/AIAA 7th Digital Avionics Systems Conference, Oct. 13-16, 1986, pp. 33-40.
Brown, Gretchen P., et al. "Program Visualization: Graphical Support for Software Development," IEEE, vol. 18, No. 8, Aug. 1985, pp. 27-35.
Reiss, Steven P. "Graphical Program Development with PECAN Progress Development Systems," Sigplan Notices, vol. 19, No. 5, 1984, pp. 30-41.
Corsini, Paolo, et al. "Multibug: Interactive Debugging in Distributed Systems," IEEE Micro, vol. 6, No. 3, Jun. 1986, pp. 26-33.

Primary Examiner—Heather R. Herndon
Assistant Examiner—Phu K. Nguyen
Attorney, Agent, or Firm—Fay, Sharpe, Beall, Fagan, Minnich & McKee

[57] ABSTRACT

A display method in an information processing device for use in software development support includes the steps of analyzing a software product before change and a software product after change. Respectively forming structure information before change and structure information after change, which consist of software element informations correlated with each other, in accordance with the respective structures of the software products. Forming structure information that forms a union set of the before-change structure information and said after change structure information, which includes all the software element informations before and after change, and appending identification information representative of the manner of change in each software element to the union set structure information. Converting at least a part of the union set structure information into its graphic format so as to be produced together with the representations of the change manners represented by the identification information.

12 Claims, 24 Drawing Sheets

FIG. 2

```
DO;
   A = 0;
   IF   B > 0
      THEN DO;
         C = A + B;
         E = E * F;
         IF  C > 0
            THEN
               X = Y + 1;
            ELSE
               C = C + 1;
      END;
      ELSE DO;
         C = A - B;
         E = E / F;
      END;
      D = 0;
      G = 100;
END;
```

FIG. 3

```
DO;
   A = 0;
   E = E + 1;
   IF   B > 0
      THEN DO;
         C = A + B;
         IF  C > 1
            THEN
               X = Y;
            ELSE
               C = C + 1;
      END;
      ELSE  DO;
         C = A - B;
         E = E / F;
      END;
      D = 0;
      G = 100;
END;
```

DISPLAY METHOD IN SOFTWARE DEVELOPMENT SUPPORT SYSTEM

This is a continuation of copending application Ser. No. 07/122,116 filed on Nov. 18, 1987, now abandoned.

BACKGROUND OF THE INVENTION

1. Field of the Invention

The present invention relates to a display method for checking software in a system for supporting the development of software (e.g. programs).

2. Description of the Prior Art

If some changes are made in software products such as programs, program design specifications, etc. (hereinafter represented by programs), comparison between an old program and a new program must be made for checking if the changes have been made as desired. In the prior art software development support system, the comparison is made, for each line in the text, between the program before change and the program after change to check the changes (addition, deletion and updating). The results of the comparison are displayed or printed out in the form of texts with identifiers respectively indicative of the lines with the addition, the lines with the deletion, and the updated lines. Incidentally, one example of making the comparison between files such as source programs, etc. is disclosed in "Information Processing" Vol. 24, No. 4, April 1983, pages 514 to 520.

Generally, in order to test the program, the change in the variants in the course of the test is checked. The conventional system for this purpose includes the types of: interruptinq the execution of a program at each of the interrupting points preset in the program to display the value of the variable specified previously or at the interrupting point, and interrupting the execution of a program when each of previously specified conditions (value change, reaching a predetermined value, etc.) for a previously specified variable is made, in order to display the value of the variable specified previously or at the interrupting point. Incidentally, one example of the conventional test support systems is disclosed in "HITACHI HYORON" Vol. 66, No. 3, Mar. 3, 1984, pages 33 to 36.

SUMMARY OF THE INVENTION

The conventional method of displaying the comparison results in the form of texts makes it difficult to intuitively and synthetically understand the change contents, so that the recognition of the change is delayed and errors are apt to be missed. Therefore, the efficiency and reliability in the change of the program (debug, version up, etc.) will be deteriorated.

Thus, the first object of the present invention is to provide a display method that graphically displays the positions and types of the changes of a program, thereby intruitively and synthetically understanding the change to improve the efficiency and reliability in the program change.

Further, the above-mentioned conventional method of displaying the value of a variable doesn't display the variable value before or after the interruption so that it cannot follow the change of the variable value and so cannot find an unexpected change thereof which would have occurred in the course of executing the program. Thus, the detection of bugs will be incomplete, and the debug thereof will be difficult as the case may be. This problem can be solved to a certain degree by setting further minutely interrupting points or interrupting conditions. However, if they are intended to be minutely set, the procedure of setting them will become complex correspondingly so this solution has a limit. Further, there can be taken a technique of displaying the variant values for the execution of each step. This technique, however, requires a specialized manner of the display. In both conventional techniques, for each updating of the display, the name and value of a variable is successively added, e.g. for each line, to the old display. Therefore, the same variant will be displayed separately at many positions, thereby making it difficult to follow the variant. Also, if the number of updating the display is great, the variable displays are scrolled since the matter to be displayed cannot be displayed in one screen, thus making the display indistinct, or the number of the data to be displayed are excessively increased, thus making it difficult to extract useful information.

The second object of this invention is to provide a display method of displaying variable values in the course of executing the test of a program in a plain manner by means of a simple operation, thereby making easy the debug operation of the program.

The first feature of the present invention resides in comprising the steps of analyzing the software product before change with that after change to form structure information before change and structure information after change which include software element information correlated with each other in accordance with the respective software structures of the products, forming from both structure informations, structure information that forms a union set of both structure informations including all the elements before and after the change and also adding an identifier that indicates change of each software element, and converting at least a part of the structure information that forms a union set, into a graphic form to output the graphic and the change represented by said identifier.

A second feature of the present invention resides in comprising the steps of specifying the display position of a specified variable in a program to be tested, and displaying, in synchronism with the execution of each step in the program, the specified variable value obtained in the step at the specified position.

In accordance with the first feature of the present invention, the structure informations of software products before and after change are formed as e.g. tree structure information. The union-set-forming-structure information formed by the tree structure information includes all the information of the software elements not changed and changed (addition, deletion, updating) and software structure information. The information indicative of the manner of change (presence and type thereof) of each software element can be obtained by comparing the structure information before change with the structure information after change or comparing the text before change with the text after change. On the basis of the thus obtained union-set-forming-structure information with the change-indicating identifier, the display of software in the graphic form and the manner of the change of the software elements on the graphic display can be made, so that the contents of change of the software can be easily understood.

In accordance with the second feature of the present invention, the display position of the value of each variant to be displayed is fixed, and the value is displayed to be updated or added in real time in synchronism with the execution of the program step updating the value so that the process of change of a desired variable can be successively observed at the fixed position.

BRIEF DESCRIPTION OF THE DRAWINGS

FIG. 2 shows one example of a source program before change;

FIG. 3 shows one example of a source program after change;

DESCRIPTION OF THE PREFERRED EMBODIMENTS

At first, a first feature of the present invention will be explained in connection with several embodiments. In these embodiments, changes in a source program are represented in a PAD (Problem Analysis Diagram) form. The details of the PAD are explained in "Treatises in Information Processing Society of Japan" Vol. 21, No. 4, pages 259 to 267.

Figure 1:
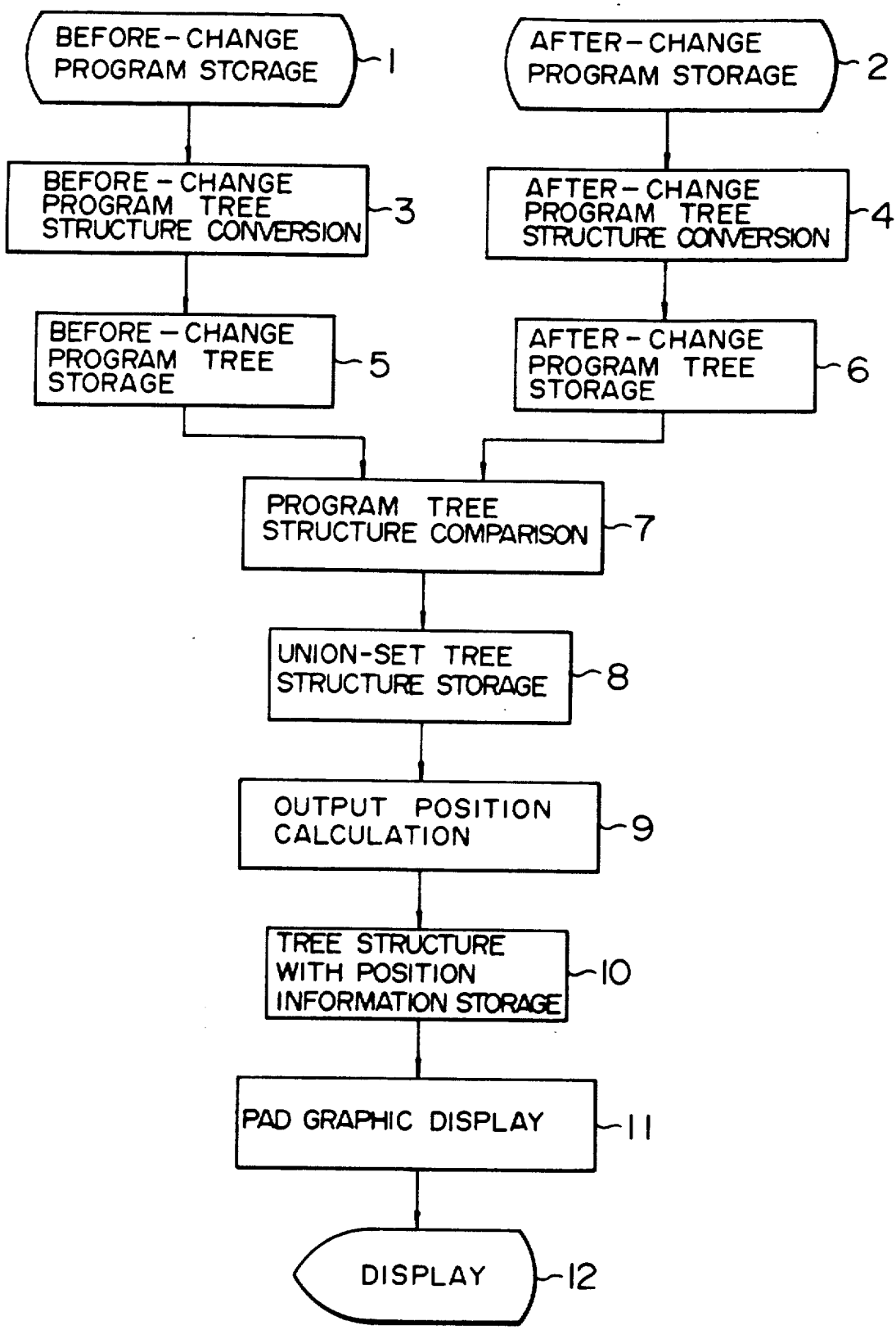
FIG. 1 is a functional block diagram of a first embodiment implementing a first feature of the present invention.

FIG. 1 shows a data processing device implementing a first embodiment of the first feature of the present invention in a functional block diagram form. Functional blocks illustrated in FIG. 1 may be implemented through software on a single processor except storage portions or may be shared by plural processors. A before-change program storage portion 1 is a memory for storing the text of a source program before-change, while an after-change program storage portion 2 is a memory for storing the text of a source program after-change. One example of the before-change source program text is illustrated in FIG. 2, while one example of the after-change source program text is illustrated in FIG. 3.

Figure 4A:
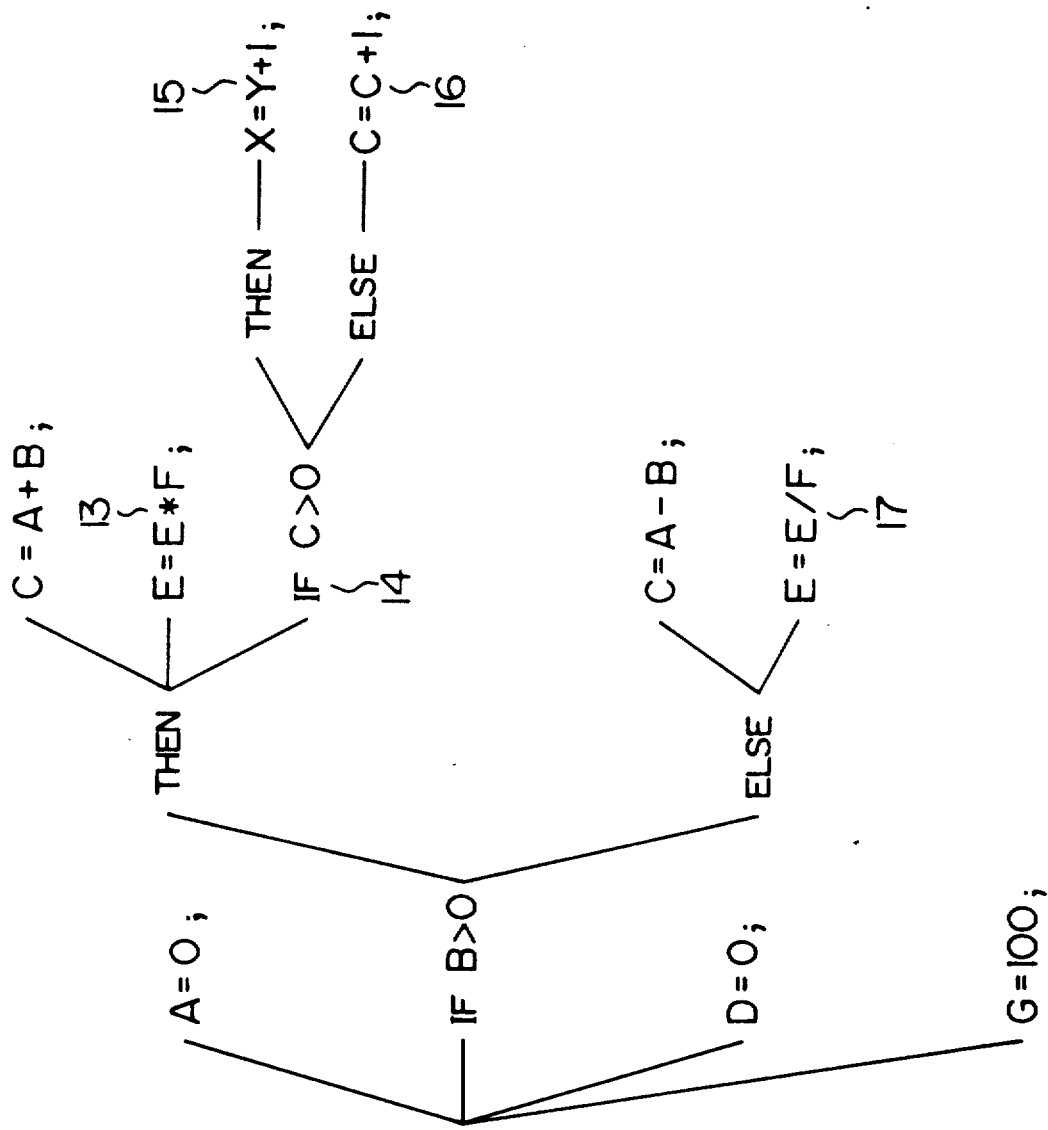
FIGS. 4A and 4B show tree structure information of the program of FIG. 2 and the PAD representation thereof.
Figure 4B:
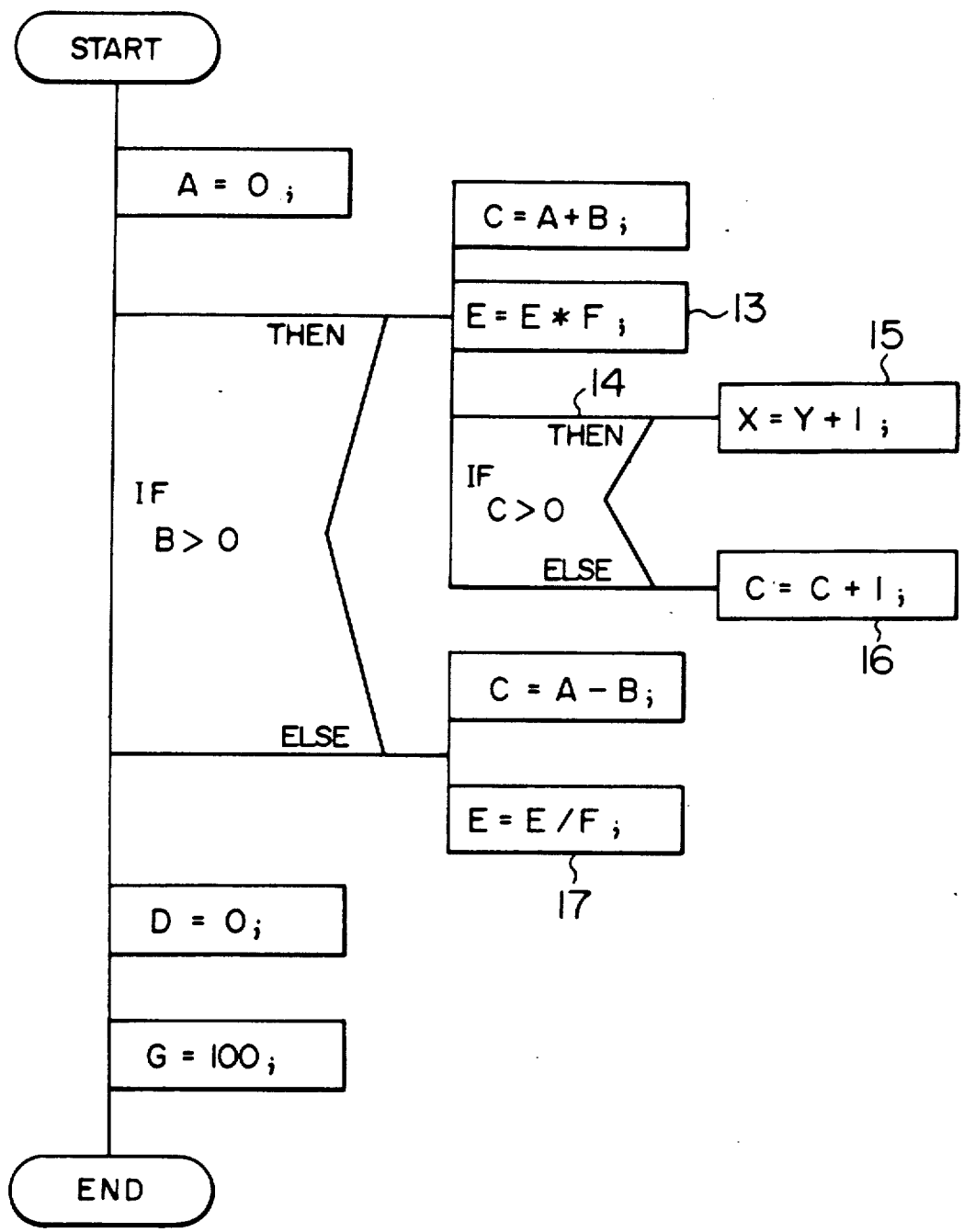
Figure 5A:
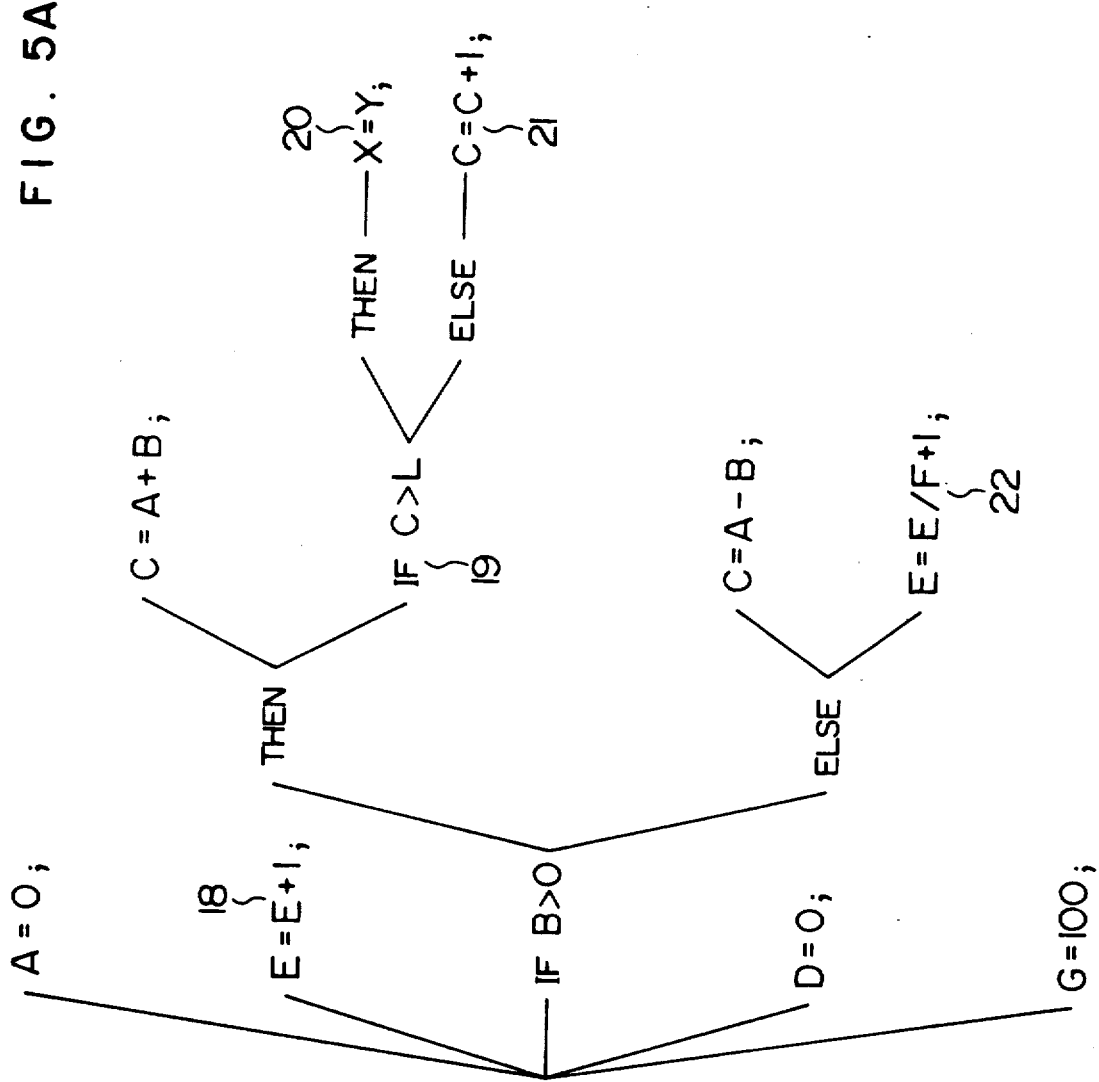
FIGS. 5A and 5B show tree structure information of the program of FIG. 3 and the PAD representation thereof.
Figure 5B:
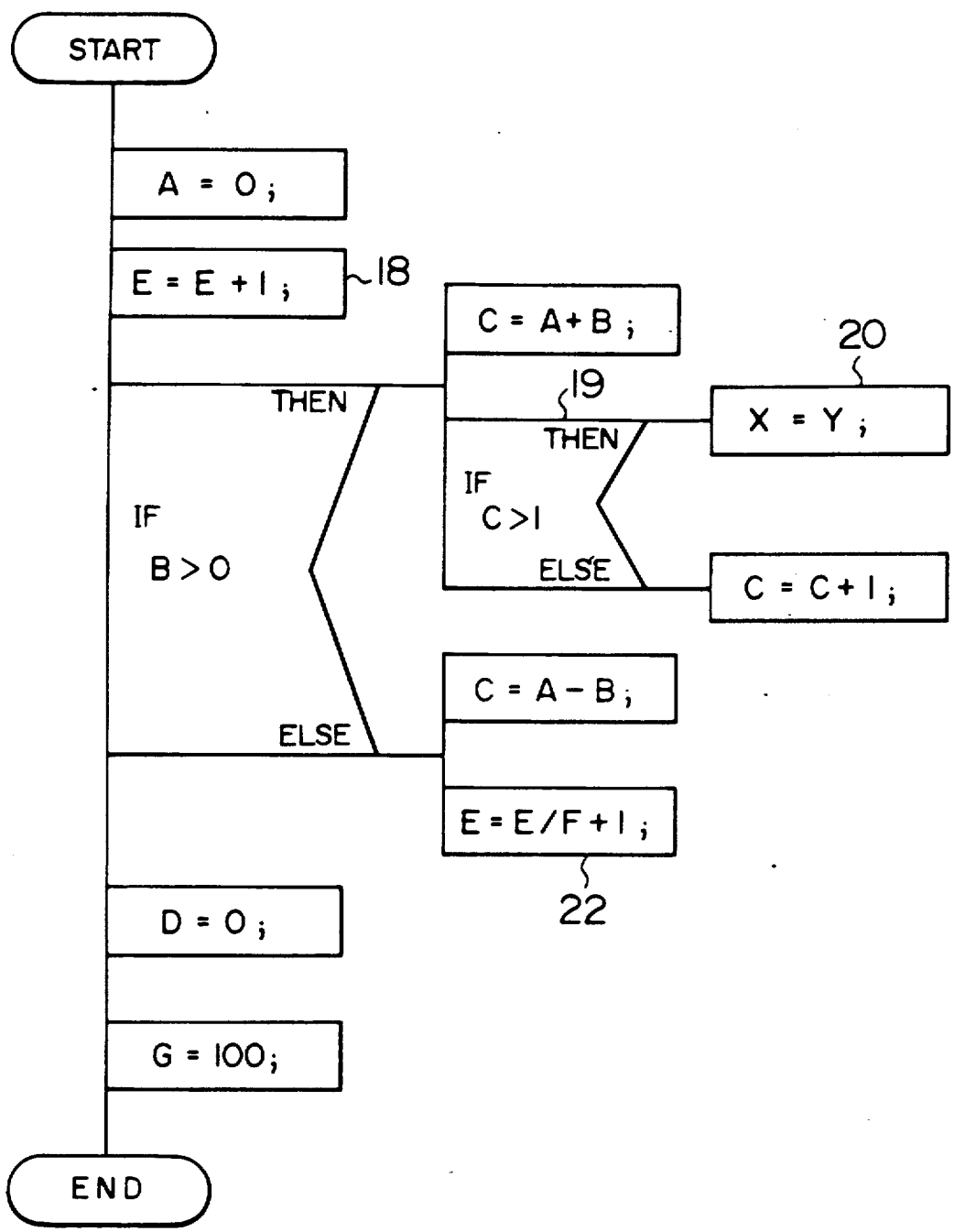

A before-change program tree structure conversion portion 3 converts the before-change source program from its text form into its tree structure form and stores the result of conversion in a before-change program tree structure storage portion 5. An after-change program tree conversion portion 4 converts the after-change source program from its text form into its tree structure form and stores the result of conversion in an after-change program tree structure storage portion 6. FIG. 4A illustrates the thus provided tree structure of the before-change source program (FIG. 2) and FIG. 4B illustrates its PAD representation. FIG. 5A illustrates the thus provided tree structure of the after-change source program (FIG. 3) and FIG. 5B illustrates its PAD representation.

Returning to FIG. 1, a program tree structure comparison portion 7 compares the before-change source program tree structure information stored in the storage portion 5 with the after-change source program tree structure information stored in the storage portion 6 to append, to the changed program elements, identifiers representative of their change type, and also unifies the before-change program tree structure information and the after-change program tree structure information to form union-set program tree information thereof and stores it in a union-set program tree structure storage portion 8. Such a processing is carried out in such a manner that the program elements of the before-change and after-change program tree structures are compared with each other travelling in the direction from their root to branches and further to leaves, so as to identify the changed (this concept includes addition, deletion and updating) program elements, and the changed elements are appended with the identifiers representative of their change type. Thus, a tree including both the changed program elements and the not-changed program elements is formed. As for the updated elements, both the before-update elements and the after-update elements are included in the union set tree structure.

Figure 6A:
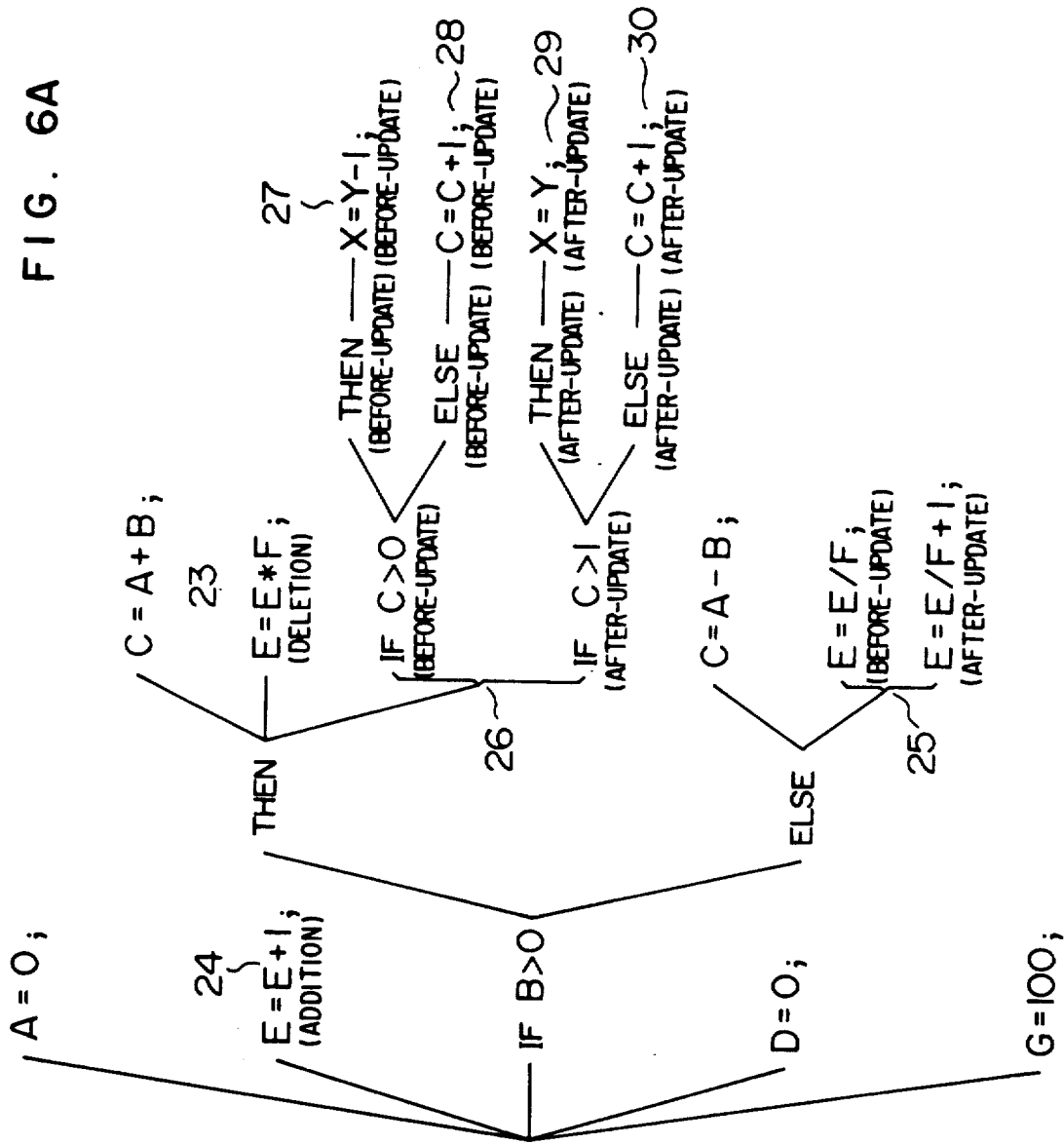
FIGS. 6A and 6B show structure information that forms a union set, which is led by the tree structure information of FIGS. 4A and 4B, and the PAD representation thereof.
Figure 6B:
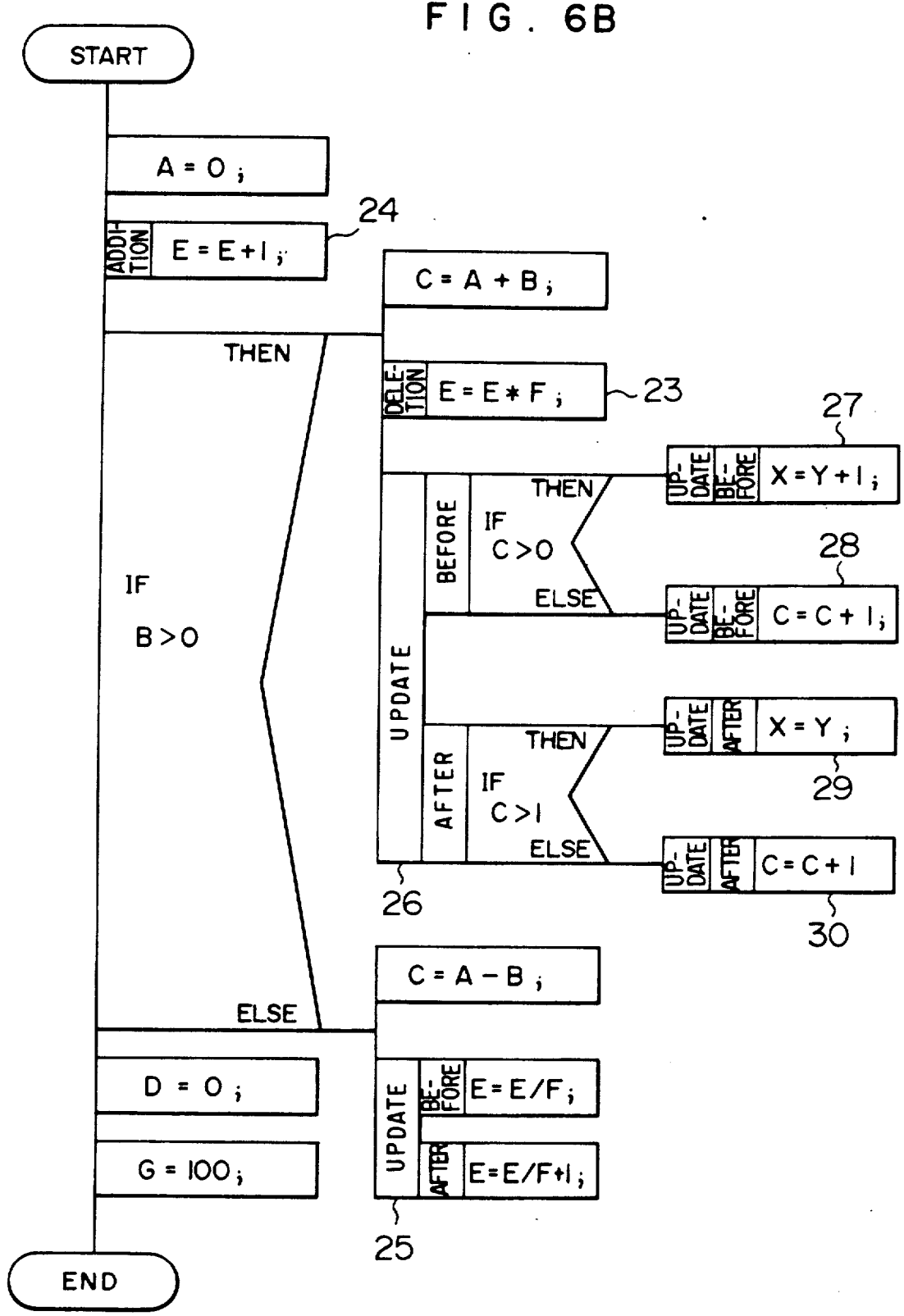
Figure 8:
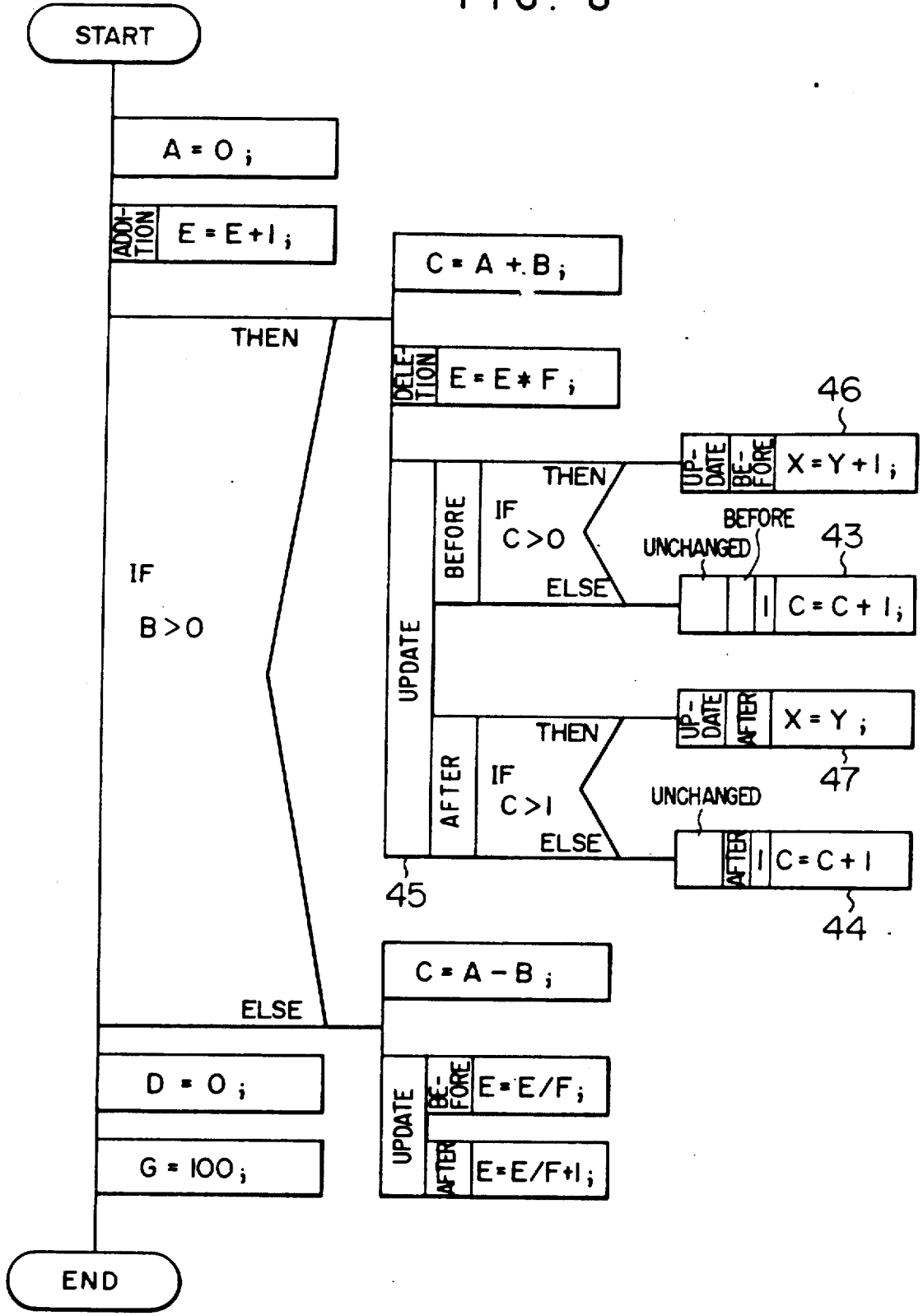
FIG. 8 shows the PAD representation of structure information that forms a union set which is provided in the second embodiment of the first feature of the present invention.
Figure 9:
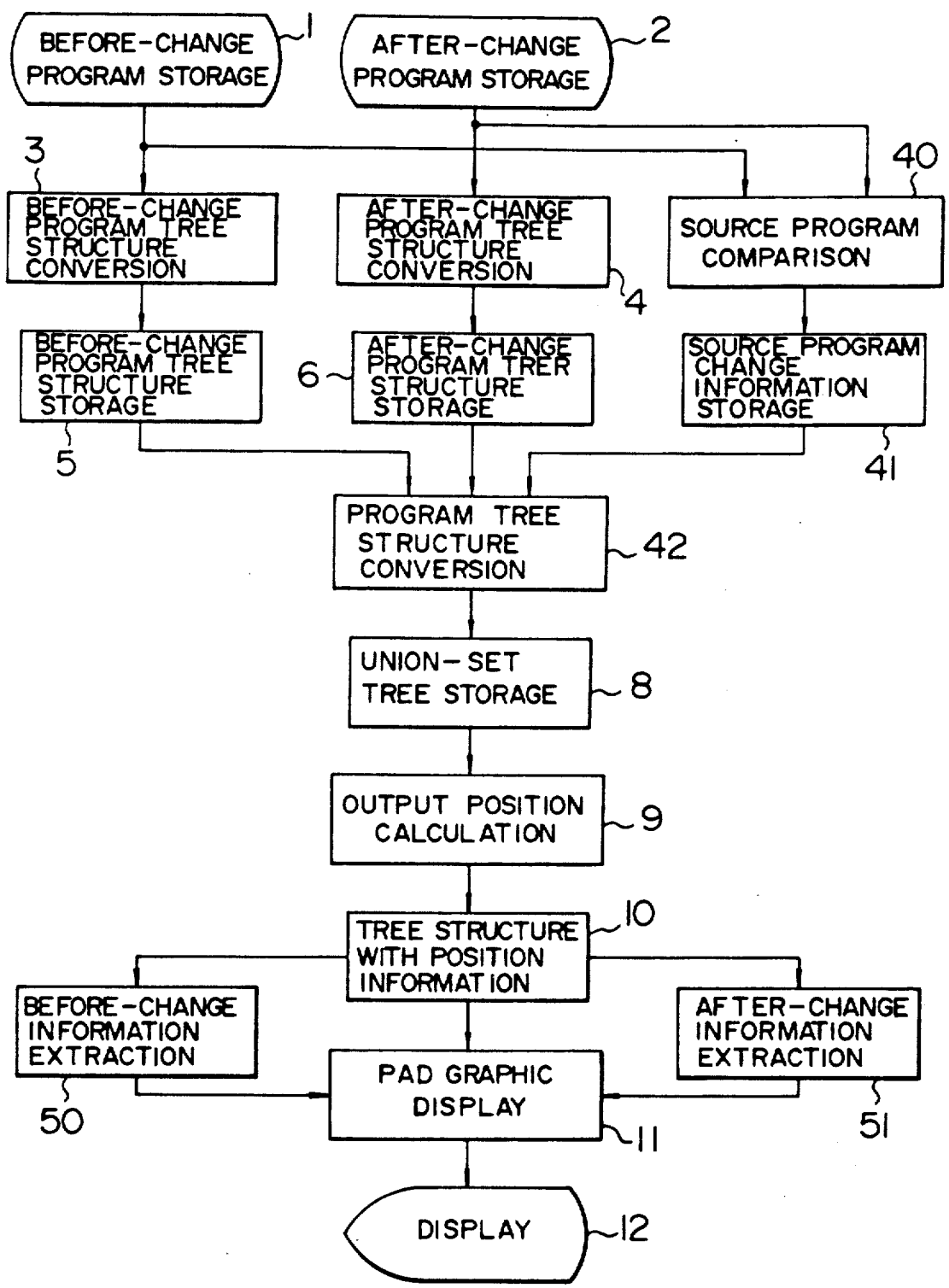
FIG. 9 is a functional block diagram of a third embodiment implementing the first feature of the present invention.

FIG. 6A shows union-set tree structure information provided, in the above-mentioned manner, from the before-change source program tree structure information shown in FIG. 4A and the after-change source program tree structure information shown in FIG. 5A, and FIG. 6B shows the PAD representation thereof. A sentence 13 in FIGS. 4A and 4B showing the before-change tree structure is deleted or disappears in FIGS. 5A and 5B showing the after-change tree structure so that the sentence 13 is preserved with the identifier representative of deletion being appended in FIGS. 6A and 6B showing the union-set tree structure. A sentence 18 in FIG. 8 is one added to the before-change tree structure of FIG. 4 so that it exists as a sentence 24 appended with the identifier representative of addition in the union set tree structure of FIG. 6. A sentence 17 in FIG. 4 is updated to a sentence 22 in FIG. 5 so that the union set tree structure of FIG. 6 includes both the before-change sentence and the after-change sentence as indicated by 25, which are appended with the identifiers representative of before-update and after-update, respectively. Likewise, a sentence 14 in FIG. 4 is updated to a sentence 19 in FIG. 6 so that as indicated by 26, the union set tree structure of FIG. 6 includes both the before-change sentence and the after-change sentence which are appended with the identifiers representative of before-update and after-update, respectively. In this case, the sentences following the sentences 14 and 19 as branches and leaves of the tree structure (sentences 15, 16 in FIG. 4 and sentences 20, 21 in FIG. 5) are also included, with the identifiers representative of before-update and after-update being appended, in the union set tree structure, as indicated by 27, 28, 29 and 30 in FIGS. 6A and 6B.

Returning to FIG. 1, an output position calculation portion 9 reads out the union set program tree structure information from the union set tree storage portion 8 to calculate the on-display display position of each of the program elements, appends the thus obtained position information to the corresponding program elements in the union set program tree structure information and stores the thus obtained union set program tree structure information with the position information in a tree structure with position information storage portion 10. A PAD graphic display portion 11 analyzes the union-set program tree information with position information in the storage portion 10 to edit the PAD display information in accordance with the PAD notation and also to convert the change type information into the corresponding display information (character, color, graphic, etc.). The thus obtained display information is sent to a display 12 to be displayed on the screen in such a manner as shown in FIG. 6. The presence and/or type of change may be represented by colors, blinks, chrominance changes, graphic symbols, etc.

In the embodiment mentioned above, if a certain program element has branches and leaves, which means selection and iteration, when the program element is changed, the same change identifier is unconditionally appended to all the program elements belonging to these branches and leaves. This is because the comparison of the program tree structure (7 in FIG. 1) is carried out along the tree structure from the root of the tree towards the branches and leaves. Therefore, even if the program elements belonging to these branches and leaves are actually not changed, they are displayed as if they themselves were changed. For example, the sentence 16 in FIG. 4 corresponding to the sentence 21 in FIG. 5 has not been entirely changed. However, since the sentence corresponding to its root (parent node) has been changed in the selection (branch) condition (from 14 of FIG. 4 to 19 of FIG. 5), the same sentences (16, 21) appear as a before-update program element (28 of FIG. 6) and an after-update program element (30 of FIG. 6) in the union set tree structure. This is inconvenient to understand the actual condition of the change.

Figure 7:
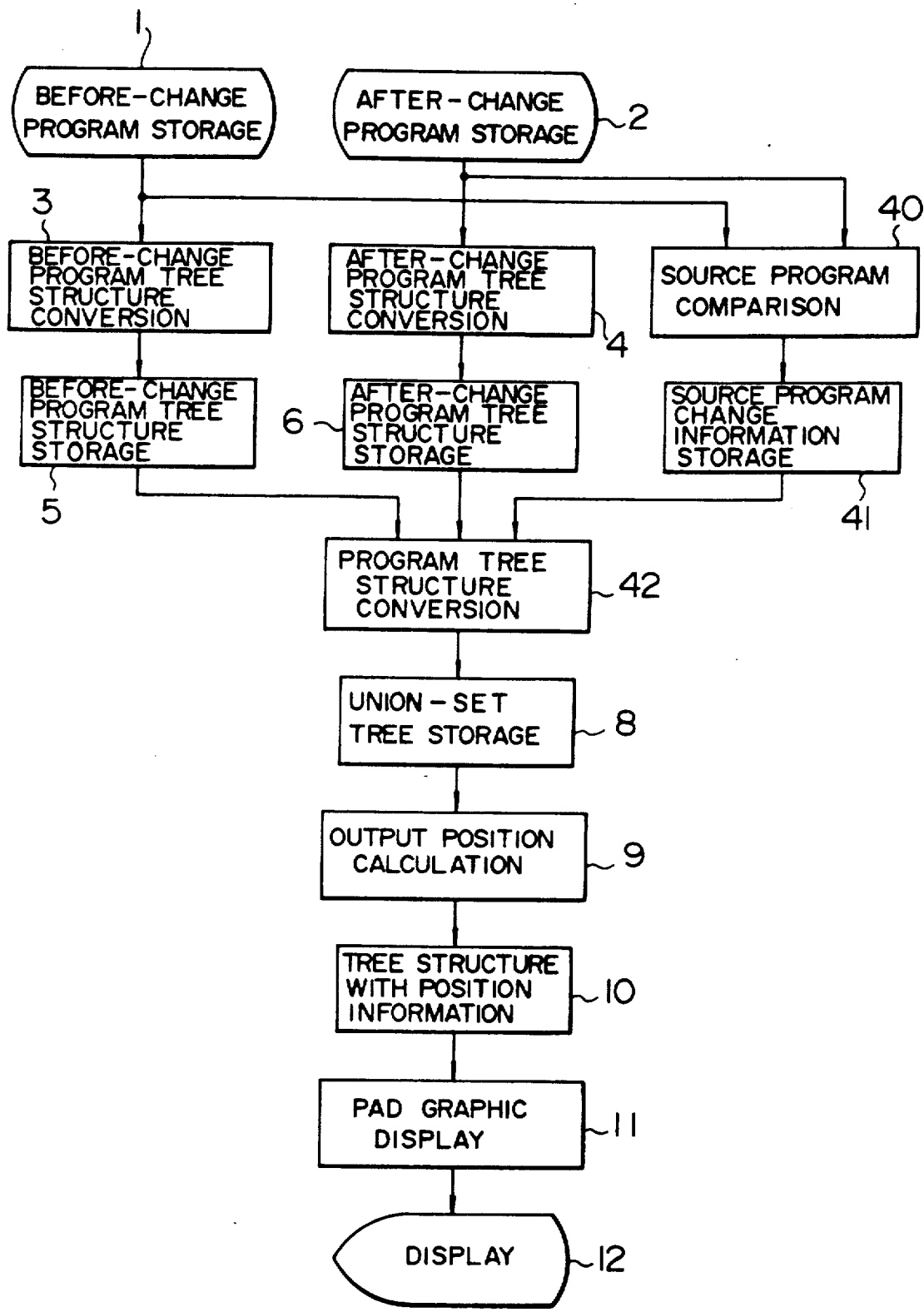
FIG. 7 is a functional block diagram of a second embodiment implementing the first feature of the present invention.

Another embodiment shown in FIG. 7 intends to improve the above inconvenience using the result of direct comparison of the program texts in addition to the comparison of the tree structure information. In this embodiment, a source program comparison portion 40 and a source program change information storage portion 41 are added to the embodiment of FIG. 1. The source program change information in the storage portion 41 is sent to the program tree structure comparison portion 42 together with the tree structure information before and after change.

The source program comparison portion 40 directly and successively compares the before-change source program text from the storage portion 1 with the after-change source program text from the storage portion 2 to detect the program elements changed (addition, deletion and updating) and stores the results in the source program change information storage portion 41. In this comparison, only such a planelike comparison as disclosed in the aforementioned "Information Processing" is carried out irrespectively of the structures of programs. This comparison makes it possible to detect the manner of change in each of the program elements themselves irrespectively of the presence or absence of change in a program element that is the root of the program element of interest.

A program tree structure comparison portion 42 form union set tree structure in the same manner as in the program tree structure comparison portion 7 in FIG. 1, and then decides the identifiers to be appended to the individual program elements referring to the source program change information in the storage portion 41. Specifically, the program elements belonging to the branches and leaves of the changed program, if they themselves have been changed, are appended with their change type, and, if they themselves have not been changed, are appended with the identifier representative of unchangedness and the identifier representative of a pair of the program elements corresponding to each other. FIG. 8 shows the PAD representation of the union set tree structure information provided in the manner mentioned above from the before-change program of FIG. 2 and the after-change program of FIG. 3, which corresponds to FIG. 6B. In the sentences belonging to the branches from the changed sentence 45 (which corresponds to the sentence 26 in FIG. 6B), the sentence 43 in the before-change program and the sentence 44 in the after-change program correspond to each other and any change doesn't exist therebetween. Therefore, these sentences are appended with the identifier representative of unchanged and the identifier representative of the correspondence (in this case "1"). In contrast, the sentence 46 itself is updated to the sentence 47 so that the sentence 46 and the sentence 47 are appended with the identifiers representative of before-change and after-change respectively. The succeeding processing is the same as in FIG. 1.

If, in addition to the graphic display of the union set of the program elements before change and after change, a part consisting of only the before-change program elements and a part consisting of only the after-change program elements can be individually displayed, the actual state of the changes can be further easily understood. In order to implement such a display, an embodiment shown in FIG. 9 adds a before-change information extraction portion 50 and an after-change information extraction portion 51 to the arrangement of FIG. 7. The before-change information extraction portion 50 extracts only the information on the before-change program elements from the union-set tree structure information with position information stored in the storage portion 10 by checking the identifiers and supplies the extracted information to the PAD graphic display portion 11. Likewise, the after-change information extraction portion 51 extracts only the information on the after-change program elements and supplies it to the PAD graphic display portion 11.

Figure 10:
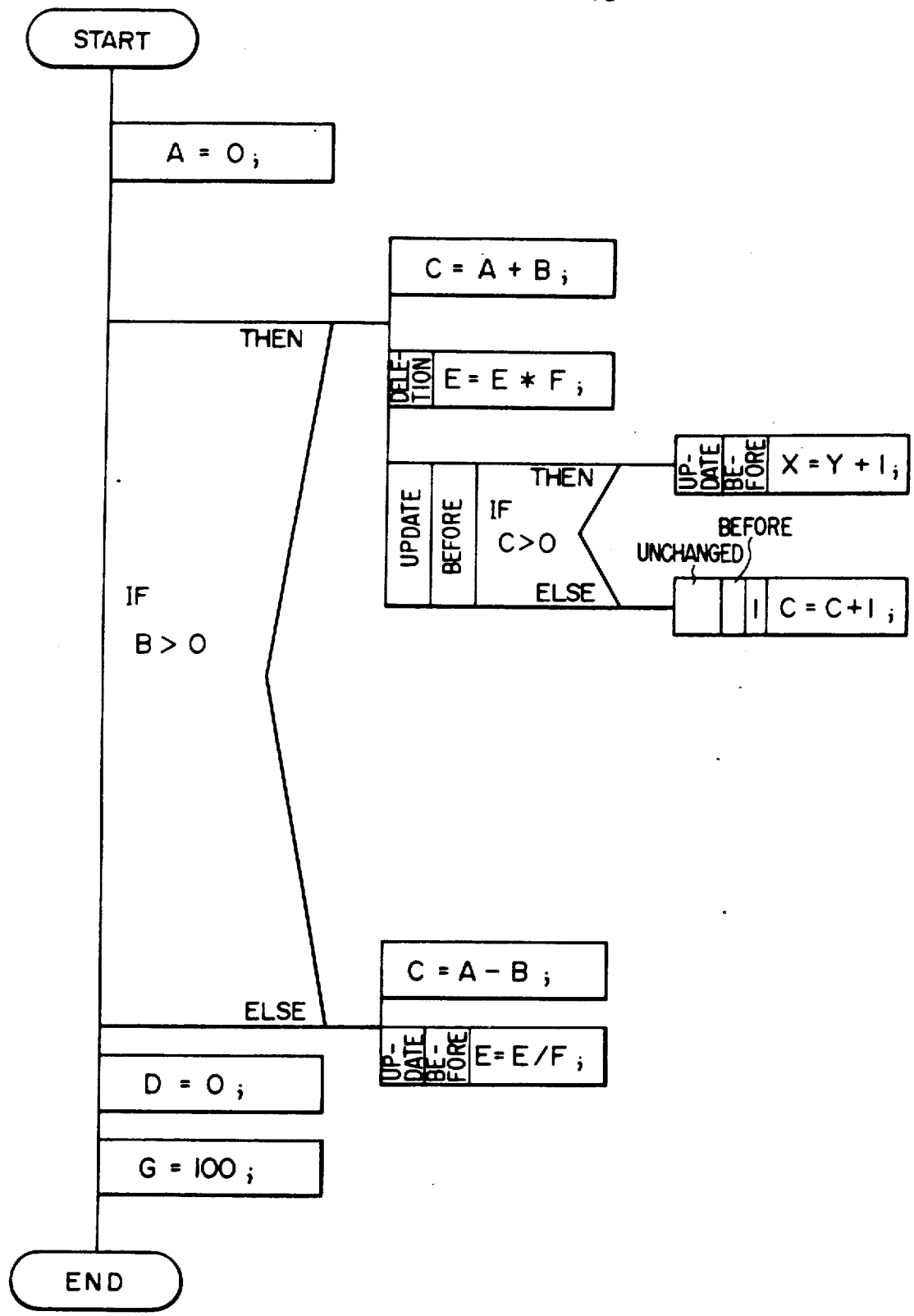
FIGS. 10 and 11 show the PAD representations of the programs before and after change in the third embodiment of the first feature of the present invention.
Figure 11:
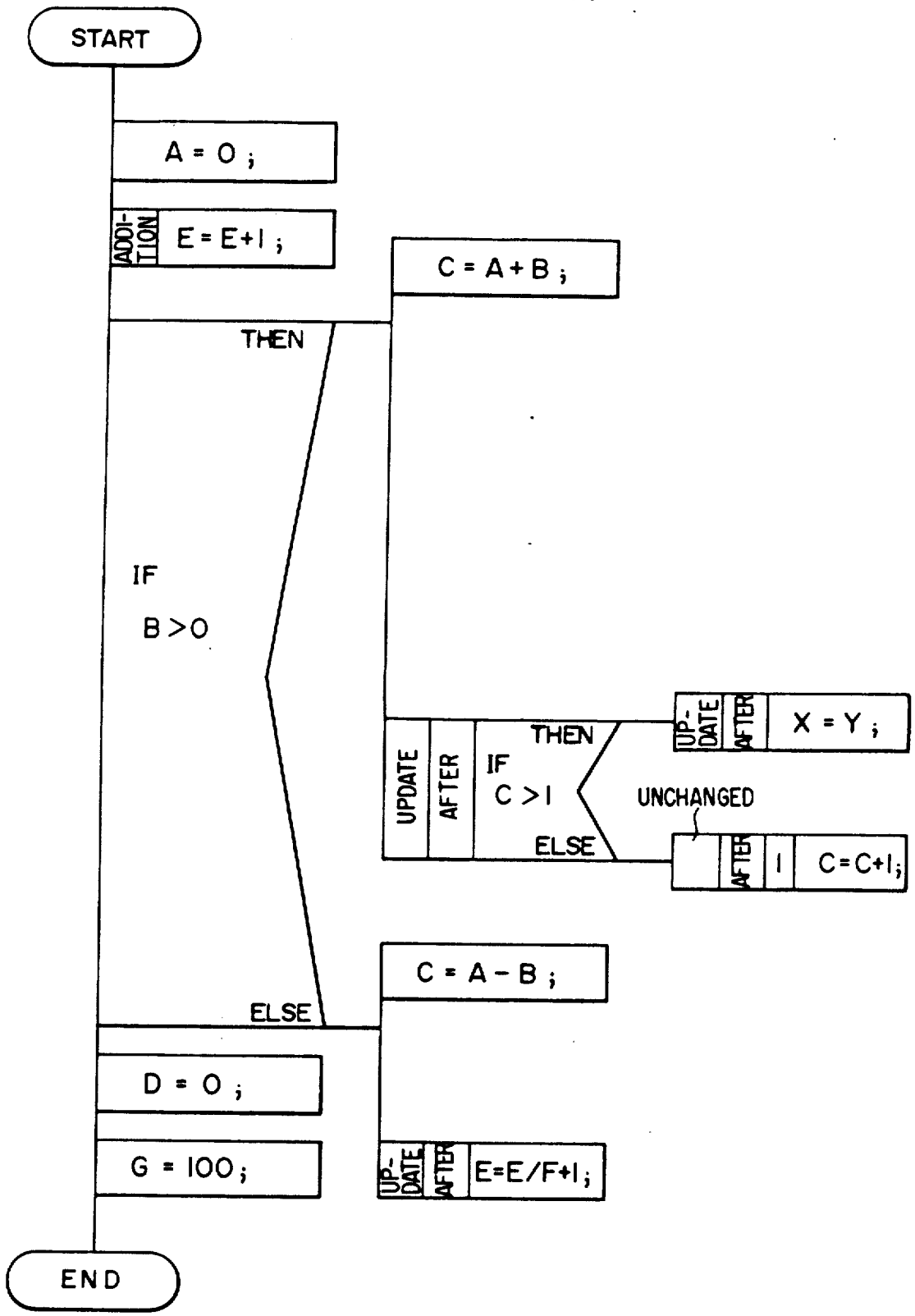

FIG. 10 shows the PAD representation of the before-change program information provided in the above-mentioned manner from the union set tree information corresponding to the PAD representation of FIG. 8. FIG. 11 shows the PAD representation of the after-change program information provided in the same manner. In FIGS. 10 and 11, the corresponding parts of the union set tree structure with position information of FIG. 8 are employed as they are so that the positions and types of the changes are displayed in the same manner as in FIG. 8 and also the positions of the respective program elements are the same as in FIG. 8. Thus, by comparing the displays shown in FIGS. 8, 10 and 11, the actual state of the changes can be further easily understood. These three kinds of display may be exchanged one by one by the operation by an operator, otherwise, optionally selected two or all the displays may be juxtaposed or superposed. In the latter case, a display having a multiwindow function can be conveniently used.

In the several embodiments mentioned above, a tree structure has been adopted as the representation of a program. However, any other representation form may be adopted if it can represent the logical relations among the program elements. Also, any display means other than the display may be used if it can produce graphics. For example, a dot printer (regardless of an impact type and non-impact type) may be used.

Figure 12:
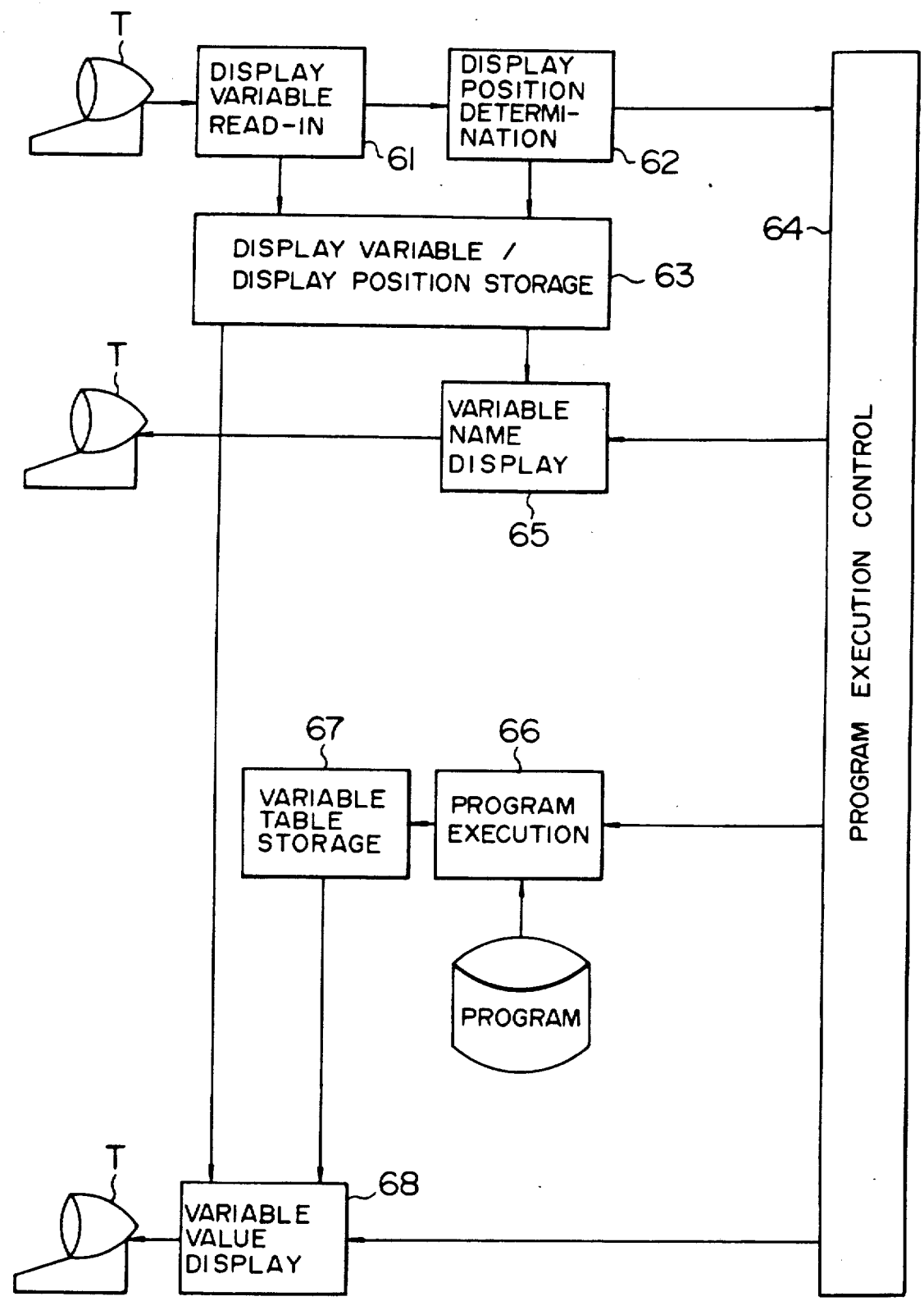
FIG. 12 is a functional block diagram of a first embodiment implementing a second feature of the present invention.

Now, several embodiments of a second feature of the invention will be explained. FIG. 12 shows a data processing device for implementing a first embodiment in a functional block diagram form. Although terminals 7 in FIG. 12 are actually a single unit, they are repeatedly illustrated to clarify the relation thereof with other functions. A display varient read-in portion 61 reads in, from the terminal 7, the name of a variable specified so that its value is displayed on the screen. A display position determination portion 62 determines the on-screen display positions of the respective variables read in by the display variable read-in portion 61 in accordance with a prescribed rule (for example, so as to be arranged from top to bottom in the read-in order). A display variable/display position storage portion 63 stores the names of the variables read-in by the display variable read-in portion 61 and their display positions determined by the display position determination portion 62 in a correlated manner therebetween. A program execution control portion 64 controls the activation of a variant name display portion 65, a program execution portion 66 and a variant value display portion 68. The variant name display portion 65 reads out the information on the variable names to be displayed and their display position and displays the variable names at the specified positions on the screen of the terminal 7. The program execution portion 66 executes the program to be tested, step by step, referring to or updating the variants preserved in a variable table storage portion 67. The variable table storage portion 67 stores the values of all the variables in the program at the respective time point in a table form. A variable value display portion 68 displays the variable values (stored in the variable table storage portion 67) of the variables to be displayed, which are stored in the display variable/display position storage portion 63, at the display positions stored in the storage portion 63.

Figure 13:
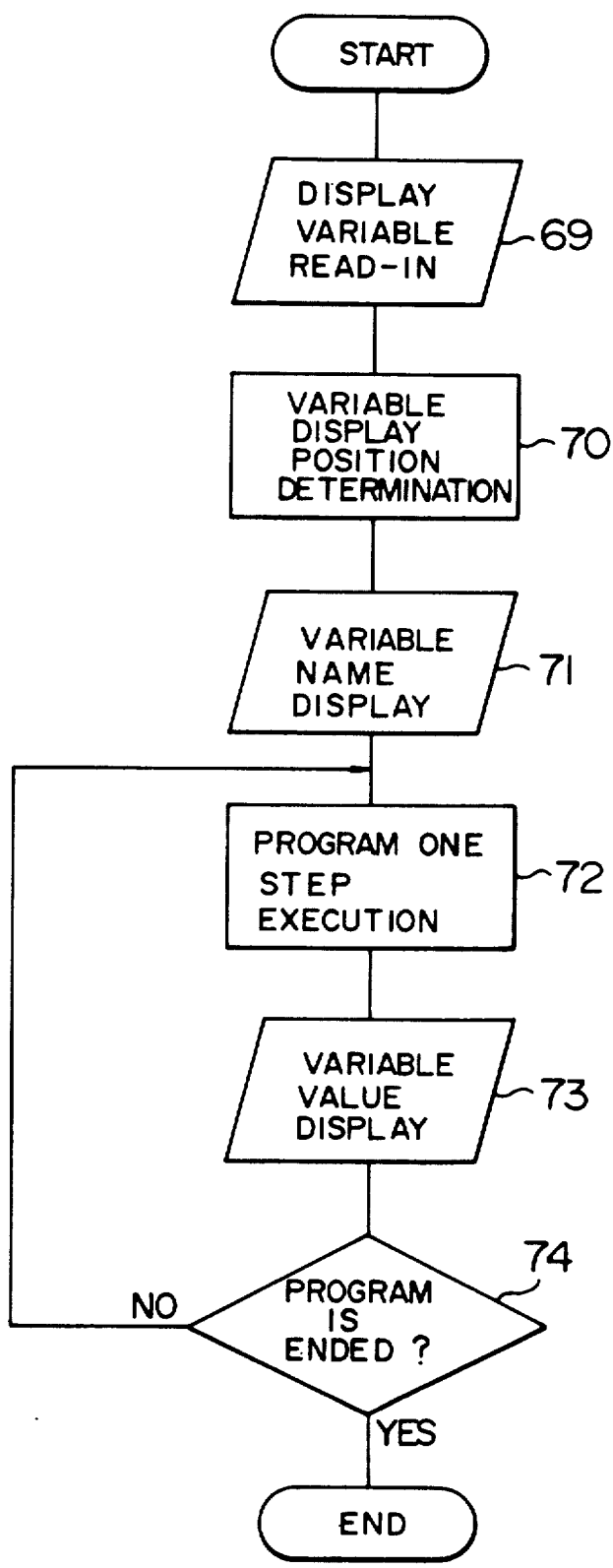
FIG. 13 is a flowchart of the first embodiment of FIG. 12.

FIG. 13 shows a flowchart implementing this embodiment. In step 69, variables to be displayed are read in from the terminal 7 by the display variable read-in portion 61 of FIG. 12. In step 70, the display positions of the variables are determined e.g. from top to below in the read-in order by the display position determination portion 62. In step 71, the names of the variables specified in step 69 are displayed at the display positions determined in step 70 by the variable name display portion 65. In step 72, the program is executed by one step by the program execution portion 66. In step 73, the values of the variables specified in step 69 at the present time are displayed at the display positions by the variable value display portion 68. In step 74, the end of the program is judged. Then, if the program reaches the end, the execution of the program is terminated. In other cases, the processing is returned to step 72 to execute the subsequent step of the program.

Figure 14A:
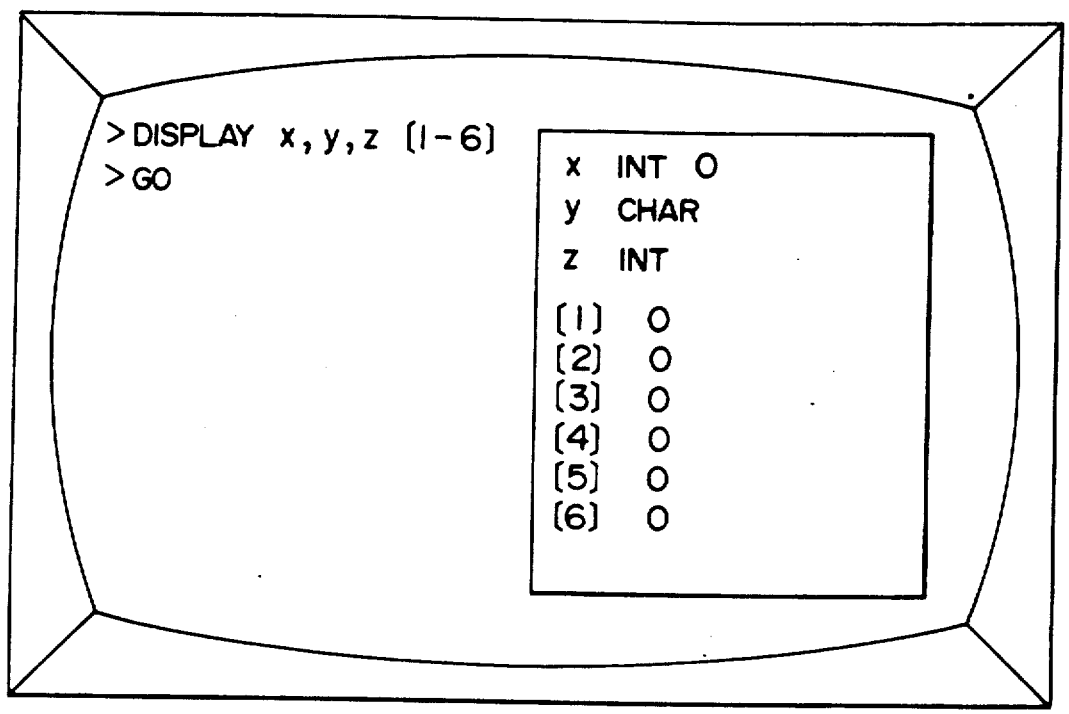
FIGS. 14A and 14B are views showing the display screens provided by the first embodiment of the second feature of the present invention.
Figure 14B:
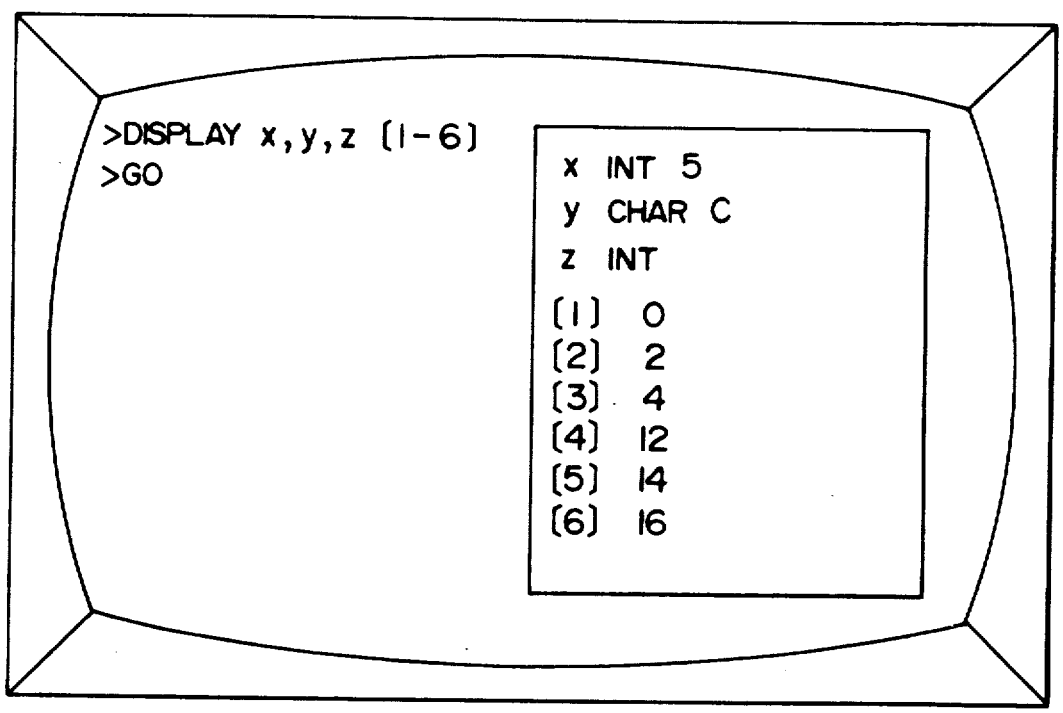

FIGS. 14A and 14B show examples of the display screen in accordance with the above embodiment when the program is executed with the variables x, y and the elements $z[1]$ to $z[6]$ of an arrangement being specified as variables to be displayed. FIG. 14A shows the display immediately after the execution of the program is started, while FIG. 14B shows the display at a certain time in the course of the execution.

Figure 15:
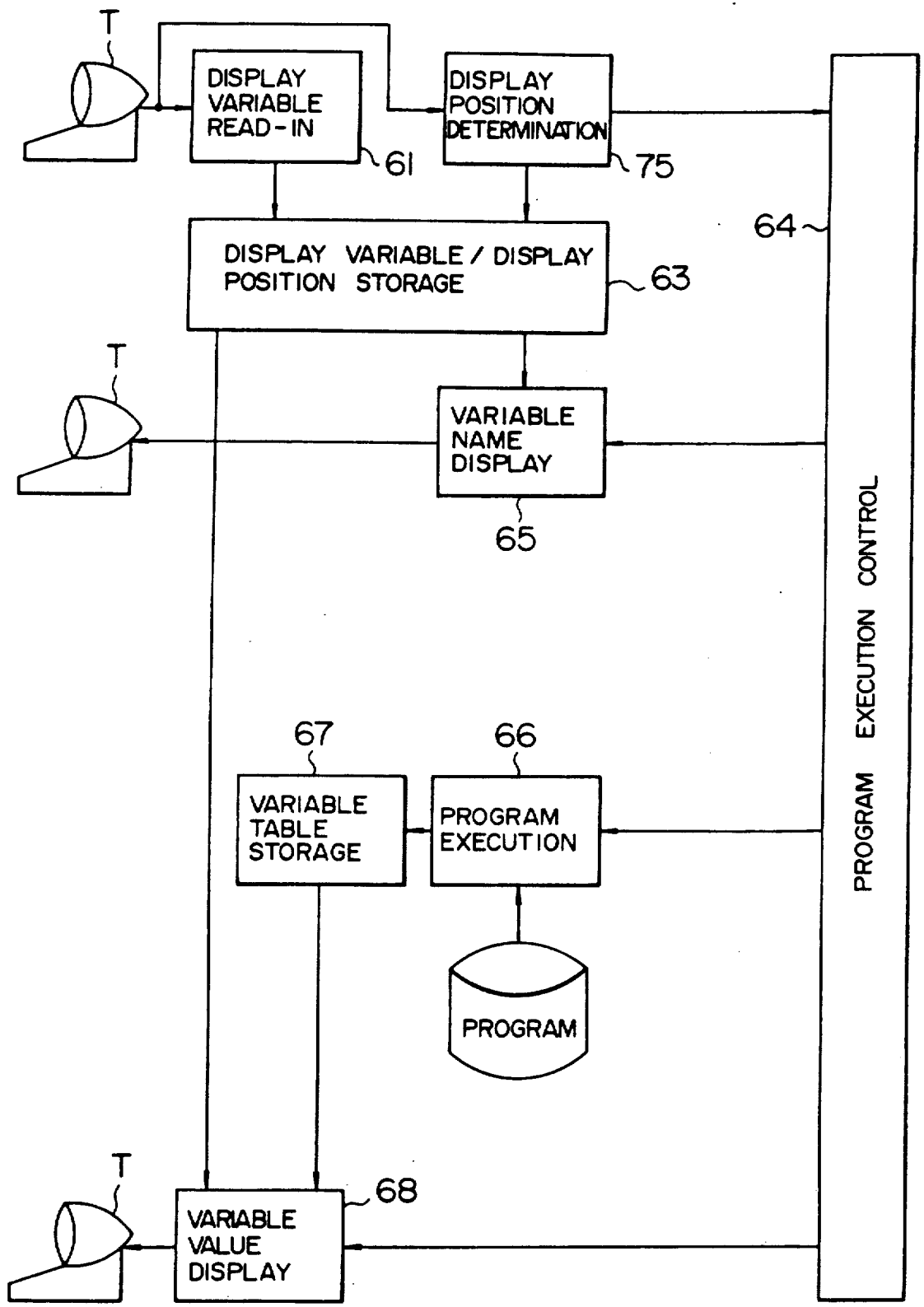
FIG. 15 is a functional block diagram of a second embodiment of the second feature of the present invention.
Figure 16:
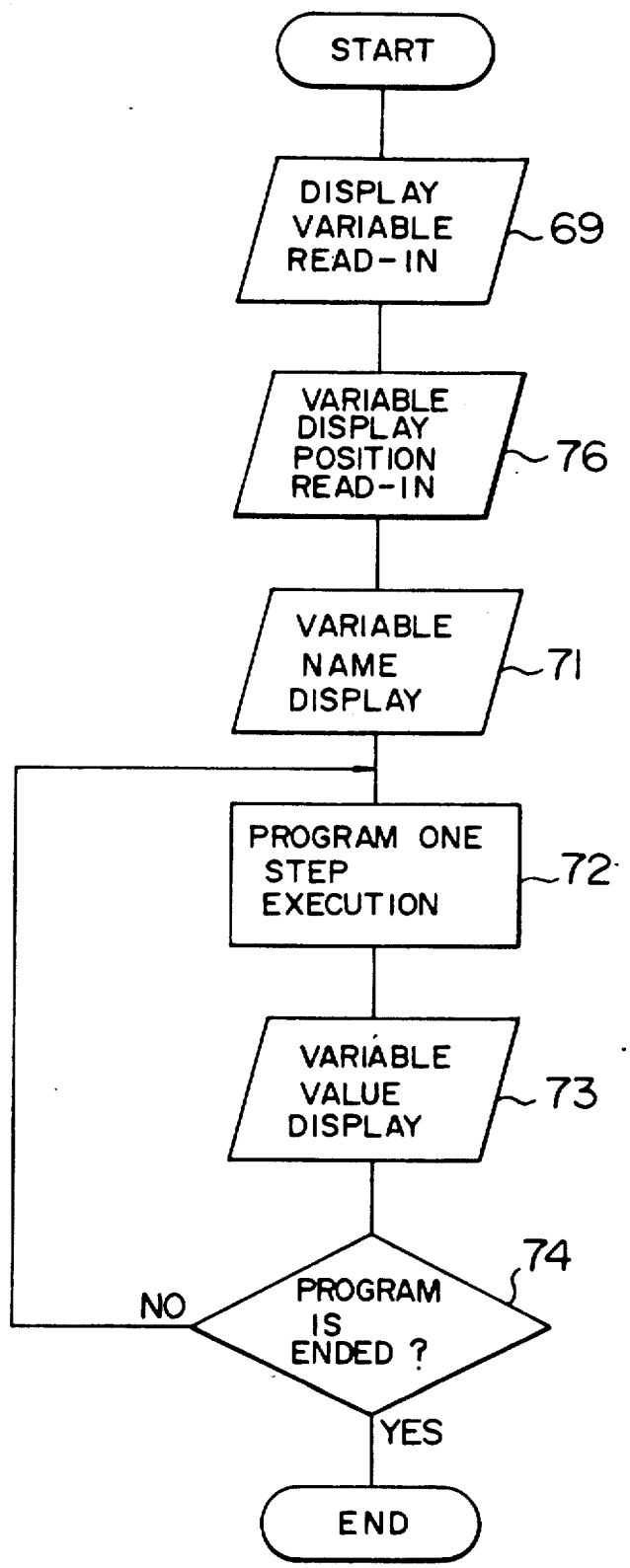
FIG. 16 is a flowchart of the second embodiment of FIG. 12.
Figure 17:
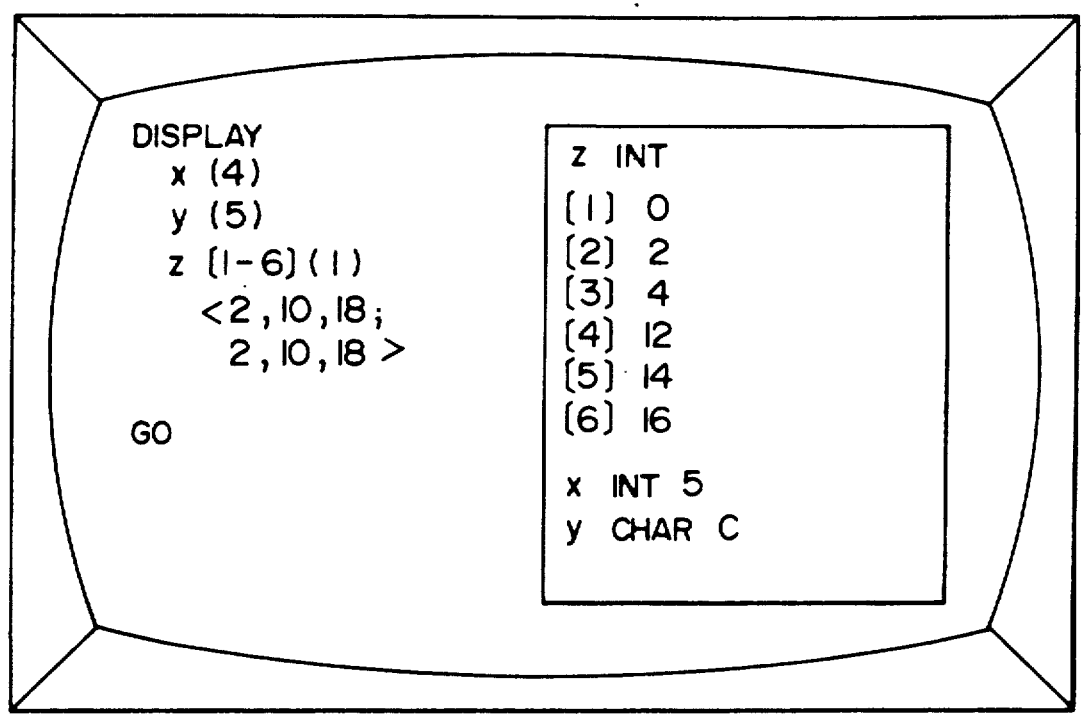
FIG. 17 is a view showing the display screen provided by the second embodiment of the second feature of the present invention.

With respect to an embodiment in which, in addition to specifying of the variables to be displayed, the display positions or locations of the variables can be specified, its functional block diagram is shown in FIG. 15, its flowchart is shown in FIG. 16 and one example of its display screen is shown in FIG. 17. In FIG. 15, the display position determination portion 62 of FIG. 12 is replaced by a display position read-in portion 75. The display position read-in portion 75 read in, from the terminal 7, the specified display positions of the variables read in the display variable read-in portion 62. In FIG. 16, the step 70 in FIG. 13 is replaced by a step 76. In step 76, the display positions of the variables to be displayed are read in from the terminal 7 by the display position read-in portion 75 of FIG. 15.

FIG. 17 shows one example of a display screen in accordance with this embodiment. In this example, in the left half of the screen, the variables to be displayed and their position are simultaneously displayed. Specifically, the names of the variables to be displayed are specified and also their display line number on the screen are specified in the parentheses right of the variable name. In the case of an arrangement, the column numbers where elements of the line are to be displayed at each of the lines sectioned by a semicolon in $<$ $>$ are specified. In the example of FIG. 17, with respect to the arrangement 2, the specification is made in such a manner that the variable name is displayed at a first line and the names and values of the elements $z[1]$ to $z[6]$ are successively displayed at the positions starting from a second, 10th and 18th columns of the subsequent two lines.

Figure 18:
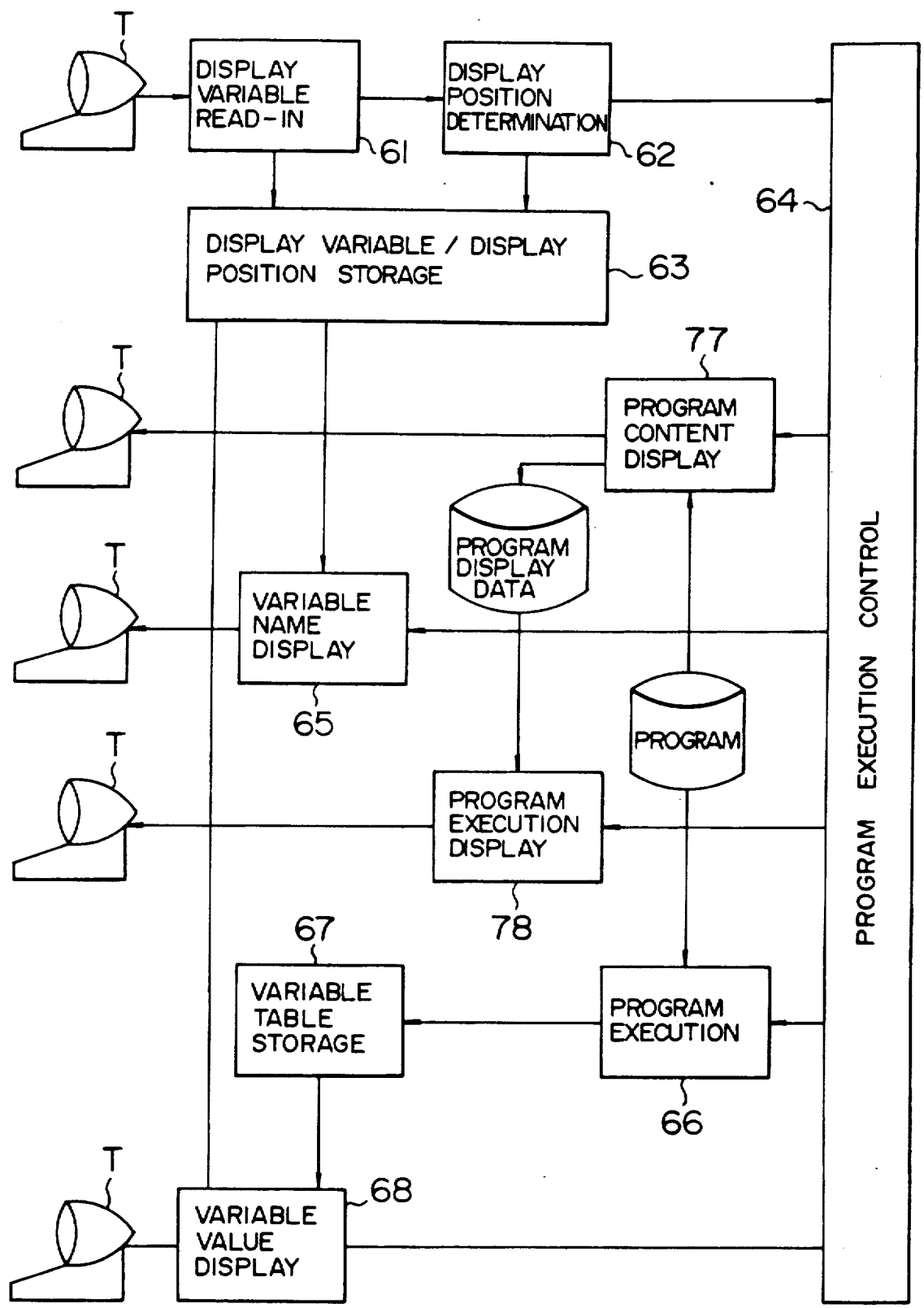
FIG. 18 is a functional block diagram of a third embodiment of the present invention.
Figure 19:
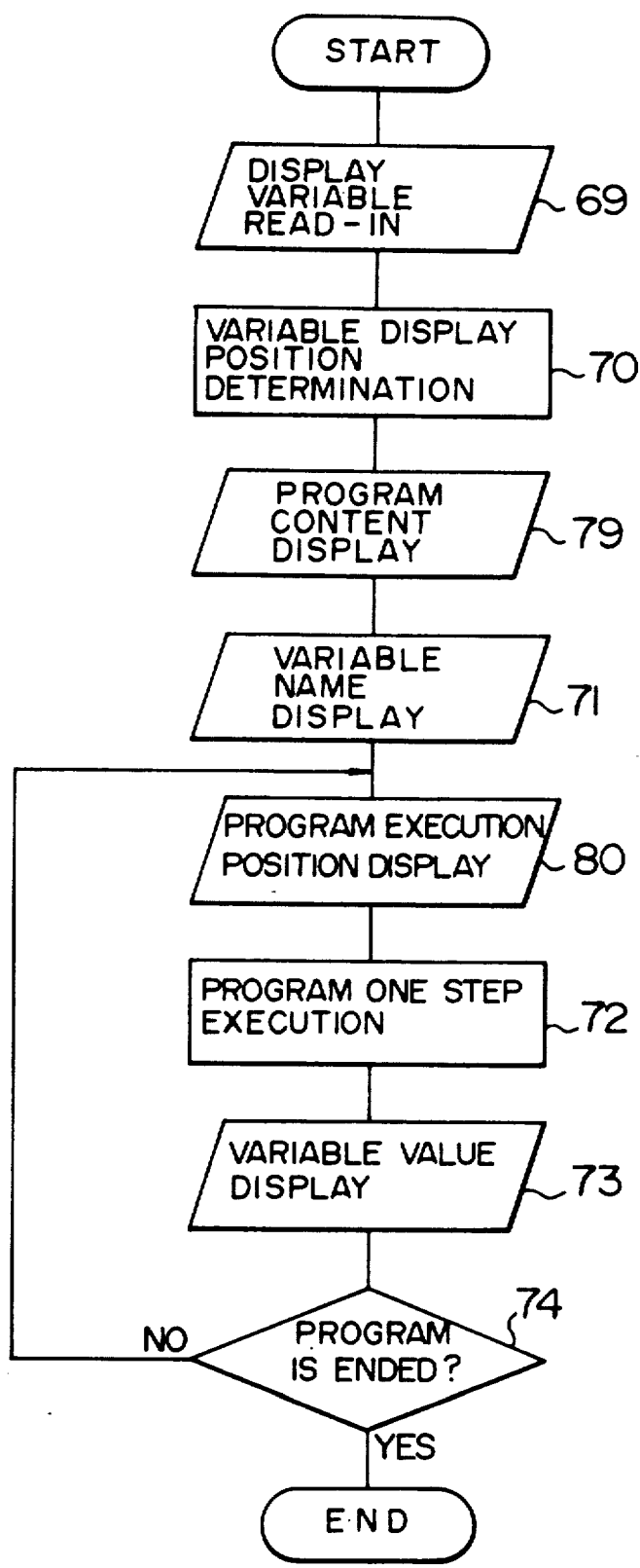
FIG. 19 is a flowchart of the third embodiment of FIG. 18.

In the embodiments mentioned above, although the changes in the variables in the execution process of a program can be observed, it is impossible to know the position where the value or change is located in the program. This problem is solved in an embodiment as shown in FIGS. 18 to 20 by displaying the contents and execution position of the program as well as the variables on the same screen. FIG. 18 is a functional block diagram of this embodiment, in which a program content display portion 77 and a program execution position display portion 78 are added to the functional block diagram of FIG. 12. The program content display portion 77 displays the contents of the program during its execution in a prescribed form. For example, the source program may be displayed in the text form as it is or may be graphically displayed in the known PAD form previously referred to. The program execution position display portion 70 displays the execution position in the displayed program contents on the basis of the display data of the program contents formed by the program content display portion 77.

In the flowchart of FIG. 19, steps 79 and 80 are added to the flowchart of FIG. 13. In step 79, the program contents are displayed on the screen in a prescribed form (e.g. PAD) by the program content display portion 77. In step 80, the execution position in the program contents being displayed as a result of the step 79 is displayed in a prescribed form.

Figure 20A:
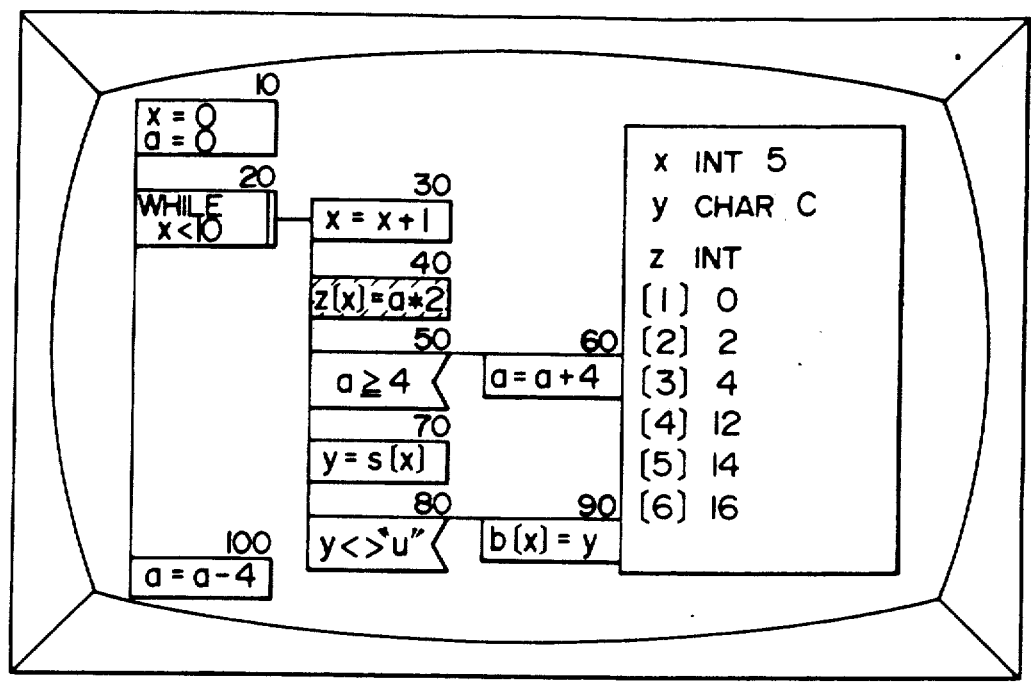
FIGS. 20A and 20B are the views showing the display screen provided by the third embodiment of the second feature of the present invention.
Figure 20B:
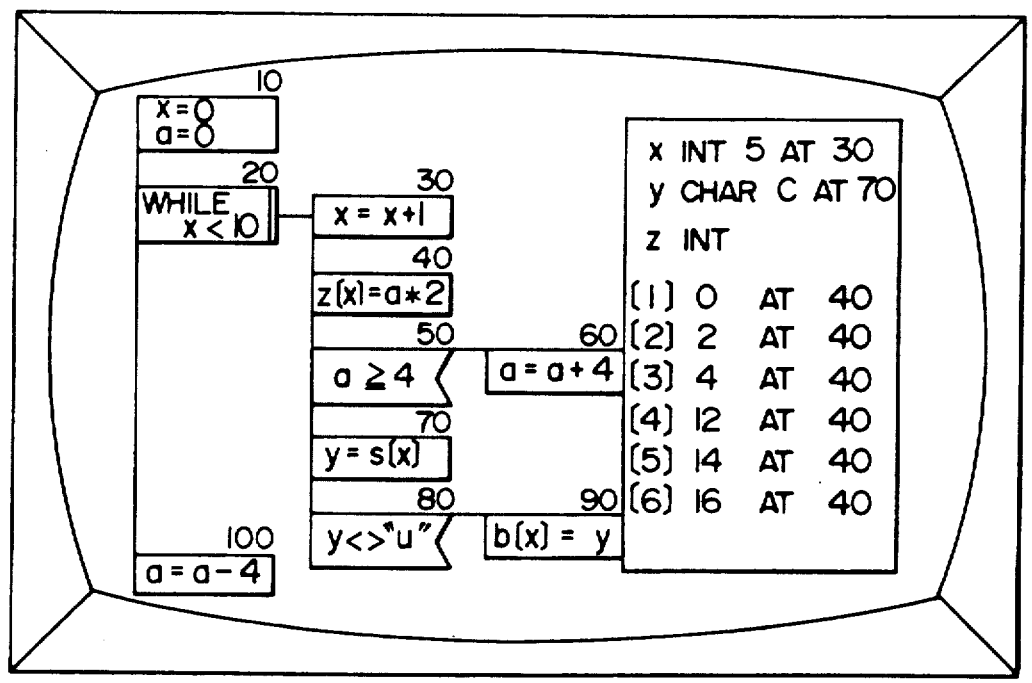

FIG. 20A shows one example of the display screen in accordance with this embodiment. The program contents are represented in PAD and the PAD box (hatched in FIG. 20A) corresponding to the processing during execution is displayed in color different from the other PAD boxes. In the other example of FIG. 20B, the number of the PAD box of the processing in which the variable value during display has been substituted for the variable of interest is displayed on the right of each variable value. The display in such a form can be realized by displaying the number of the PAD box executed on the right of the variable value processed thereby. In the display form of FIG. 20A, the PAD box during execution may be displayed in different color as in FIG. 20A. Instead of changing color, any intensified display format such as chrominance change, blink, etc.

Figure 21:
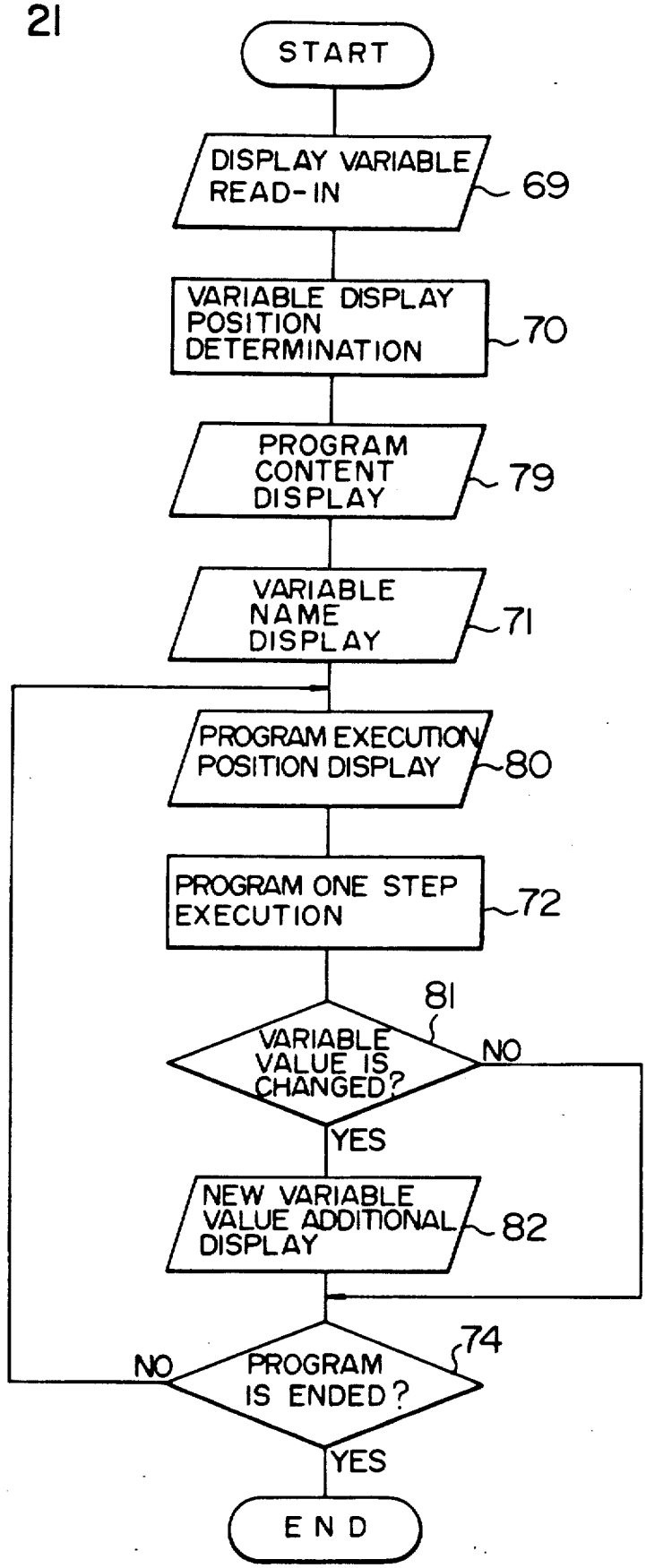
FIG. 21 is a flow chart of a fourth embodiment of the second feature of the present invention.
Figure 22:
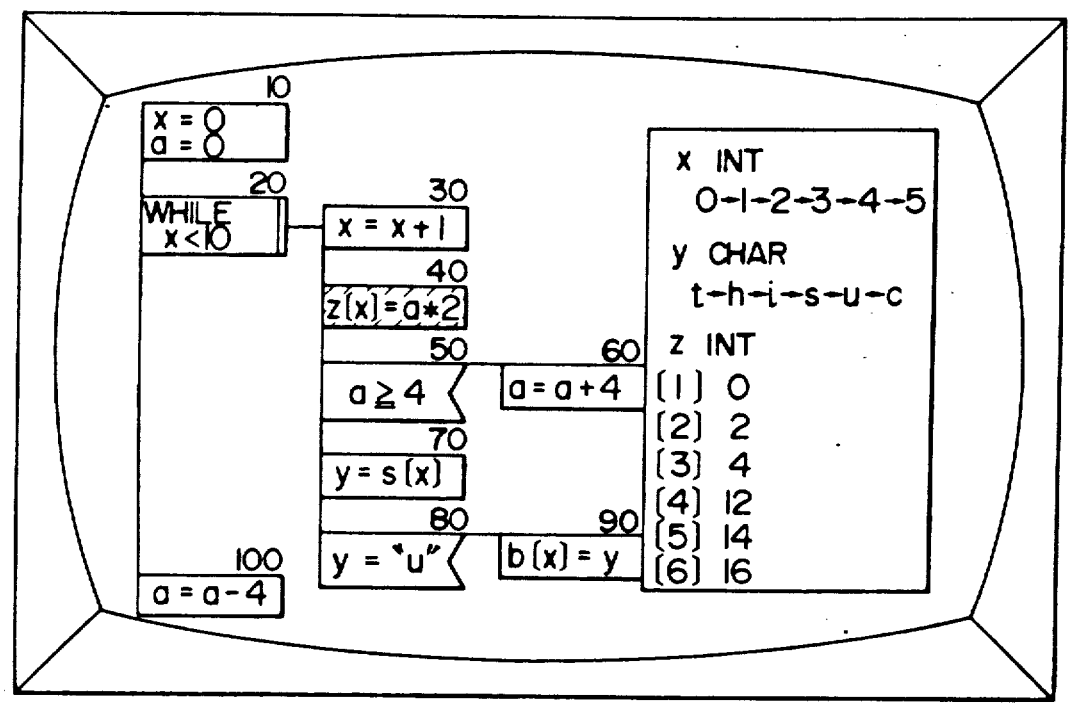
FIG. 22 is a view showing the display screen provided by the fourth embodiment of the second feature of the present invention.

In the several embodiments mentioned above, only the latest value of the variable is displayed but the changing process of the variable value is not displayed. Therefore, in order to know the changing process of the variable value, the screen must be always monitored. An embodiment in which the changing process itself of the variable value is displayed will be explained. Its functional block diagram is the same as FIG. 18 and the functions of the functional blocks included therein are the same as in FIG. 18 except the variable value display portion. Sepcifically, the variable value display portion 68 in this embodiment checks the variable values (stored in the variable table storage portion 67) of the variables stored in the display variable/display position storage portion 63. Only if the values are different from the already displayed values, the display portion 68 displays the updated value in addition to the already displayed values. FIG. 21 shows the flowchart of this embodiment. In FIG. 21, the step 73 in the flowchart of FIG. 19 is replaced by steps 81 and 82. In the variable value display processing (step 73) of FIG. 19, the old variable values are cancelled and the new variable value are displayed on the same position where the old variable values were displayed, whereas in FIG. 21, if the variable values have been changed is judged (step 81) and if so, the new variable values are displayed on the right side of the old variable values (step 82). FIG. 22 shows one example of the display screen in accordance with this embodiment. In this example, the old variable values and the new variable values are displayed in such a manner that they are chained by arrows. When the variable values have been successively changed, all the respective displays will not be included within the display screen. In this case, the old variable values may be shifted out so that a prescribed number of the newer displays remain on the screen.

In accordance with the first feature of this invention, the contents of change in software products can be easily understood intuitively and synthetically. Thus, the efficiency of software changing operations, which are often performed in the development and maintenance of the software and the reliability of the software after-change is also improved.

In accordance with the second feature of this invention, troublesome setting of interruption times and interruption conditions is not required during the test execution of a program and also the changing process of the variable values can be known instead of the variable values at intermittent interruption times. Only the values of the specified variables are displayed at predetermined positions so that they can be easily monitored and hardly missed. Thus, the efficiency of the debug operation of a program can be improved.

We claim:

1. A display method for use in a software development support system provided with an information processing device, the display method comprising the steps of:

analyzing a software program before change by ascertaining a before change tree structure indicative of a relationship among statement elements of the software program before a change in which relationship the statement elements hierarchically branch from a more rootward branch element toward more remote branch elements, and analyzing the software program after change by ascertaining an after change tree structure indicative of a relationship among the statement elements of the software program after said change;

comprising the before change and the after change tree structures progressively from the rootward most branch elements toward the more remote branch elements to form a union set tree structure indicative of software elements common to both the before change and the after change tree structures, the software elements unique to the before change tree structure and the software elements unique to the after change tree structure;

appending change identification information to the union set tree structure, the change identification information reflective of differences between at least a one of said software elements common to both the before change and the after change tree structures, the software elements unique to the before change tree structure and the software elements unique to the after change tree structure; and producing at least a portion of said union set tree structure in a graphic display.

2. The display method according to claim 1 wherein the analyzing step includes analyzing a software source program.

3. The display method according to claim 1 wherein the after change tree structure hierarchically represents statements elements of the software program after said change.

4. The display method according to claim 1 wherein the comparing step includes directly comparing texts of said before change and after change software program.

5. The display method according to claim 1 wherein said producing step includes selecting said at least a portion of said union set structure, a before change tree structure portion corresponding to the selected portion of said union set structure, and an after change tree structure portion corresponding to the selected portion of said union set structure for display.

6. The display method according to claim 5 wherein said selecting step includes selecting said portion of said union set structure and at least one of said corresponding before change and after change tree structures and wherein said producing step includes simultaneously producing the selected portions in a common graphic display.

7. A display method in an information processing device for use in software development support, the method comprising the steps of:
    analyzing a single software source program before a change and the single software source program after the change to produce a before change tree structure and an after change tree structure, respectively, which tree structures consist of software statement elements correlated with each other in a hierarchical relationship branching outward from a rootmost element;
    forming a union set tree structure from said before change tree structure and said after change tree structure, which union set tree structure includes common elements of the before and after change software, and appending to each common element of the union set tree structure change identification information representative of change between the before and after change tree structures; and,
    converting said union set tree structure and the change identification information into a graphic format, and producing a graphic display depicting structure common to the software source program before the change and after the change, and the corresponding change identification information.

8. The display method according to claim 7 wherein the forming step includes comparing said before change tree structure with said after change tree structure to obtain the change identification information.

9. The display method according to claim 8 wherein the comparing step includes directly textually comparing the before change and after change software source programs.

10. The display method according to claim 7 wherein said converting step includes selecting at least one portion of said union set structure, at least one portion of the before change tree structure, and at least one portion of the after change tree structure.

11. The display method according to claim 10, wherein said selecting step includes selecting said at least one portion of said union set structure and at least one of said at least one portion of said before change and after change tree structures which correspond to the selected union set portion, and wherein the producing step includes simultaneously displaying the selected structures.

12. In a software development support system that converts program text into a graphic display of program structure, a method of displaying changes in program structure comprising:
    analyzing a before change version of a single source program and an after change version of the source program to generate before and after change structure information for generating graphic displays of interconnected pictorially depicted program statements of the before and after change source program structure;
    comparing the before and after change structure information (i) to generate a union set which includes both before and after change source program statements and (ii) to generate a change identification corresponding to each source program statement that identifies whether and how said each statement has been changed;
    producing a graphic display of at least a portion of the union set including both before and after change source program statements with the corresponding change identification appended to each graphically displayed program statement.

* * * * *

UNITED STATES PATENT AND TRADEMARK OFFICE
CERTIFICATE OF CORRECTION

PATENT NO. : 5,191,646
DATED : March 2, 1993
INVENTOR(S) : Ichiro Naito, et al.

It is certified that error appears in the above-identified patent and that said Letters Patent is hereby corrected as shown below:

Claim 1, column 10, line 46, delete "comprising" and substitute therefor --comparing--.

Signed and Sealed this

Sixteenth Day of November, 1993

Attest:

BRUCE LEHMAN

*Attesting Officer*   *Commissioner of Patents and Trademarks*